United States Patent
Kim et al.

(10) Patent No.: US 10,575,287 B2
(45) Date of Patent: Feb. 25, 2020

(54) METHOD FOR TRANSMITTING PUCCH USING FDD FRAME IN WIRELESS COMMUNICATION SYSTEM AND DEVICE THEREFOR

(71) Applicant: LG ELECTRONICS INC., Seoul (KR)

(72) Inventors: Dongkyu Kim, Seoul (KR); Kwangseok Noh, Seoul (KR); Sangrim Lee, Seoul (KR); Hojae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/751,151

(22) PCT Filed: Jul. 29, 2016

(86) PCT No.: PCT/KR2016/008361
§ 371 (c)(1),
(2) Date: Feb. 7, 2018

(87) PCT Pub. No.: WO2017/034168
PCT Pub. Date: Mar. 2, 2017

(65) Prior Publication Data
US 2018/0242305 A1      Aug. 23, 2018

Related U.S. Application Data

(60) Provisional application No. 62/208,796, filed on Aug. 23, 2015, provisional application No. 62/330,220, filed on May 1, 2016.

(51) Int. Cl.
H04L 5/00 (2006.01)
H04W 72/04 (2009.01)
H04L 5/14 (2006.01)

(52) U.S. Cl.
CPC .......... *H04W 72/0413* (2013.01); *H04L 5/14* (2013.01); *H04W 72/0446* (2013.01)

(58) Field of Classification Search
None
See application file for complete search history.

(56) References Cited

U.S. PATENT DOCUMENTS 8,989,118 B2 *   3/2015   He .................... H04W 72/0413
                                                                 370/329
2013/0242824 A1   9/2013   Lee et al.
(Continued)

OTHER PUBLICATIONS

PCT International Application No. PCT/KR2016/008361, Written Opinion of the International Searching Authority dated Nov. 1, 2016, 19 pages.

(Continued)

*Primary Examiner* — Ajit Patel
(74) *Attorney, Agent, or Firm* — Lee Hong Degerman Kang Waimey

(57) ABSTRACT

A method for a terminal transmitting a PUCCH using a FDD frame in a wireless communication system comprises the step of transmitting the PUCCH using two subframes in the FDD frame, wherein the two subframes may each comprise a resource for receiving a downlink in an uplink band.

12 Claims, 26 Drawing Sheets

(56) References Cited

U.S. PATENT DOCUMENTS

| | | | |
|---|---|---|---|
| 2014/0348036 A1* | 11/2014 | Li | H04W 52/325 |
| | | | 370/280 |
| 2015/0085774 A1* | 3/2015 | Lin | H04W 72/042 |
| | | | 370/329 |
| 2015/0109932 A1 | 4/2015 | Goldhamer | |
| 2015/0200752 A1* | 7/2015 | Yin | H04L 1/1887 |
| | | | 370/280 |
| 2015/0373693 A1* | 12/2015 | Wang | H04W 72/0406 |
| | | | 370/329 |
| 2017/0048740 A1* | 2/2017 | Yang | H04B 7/26 |
| 2017/0064541 A1* | 3/2017 | Uchino | H04L 5/1469 |
| 2017/0170931 A1* | 6/2017 | Kusashima | H04W 72/04 |
| 2017/0207889 A1* | 7/2017 | Mizusawa | H04W 72/0446 |
| 2017/0272229 A1* | 9/2017 | Yang | H04L 1/1812 |
| 2017/0353285 A1* | 12/2017 | Yang | H04L 5/00 |

OTHER PUBLICATIONS

LG Electronics, et al., "Further discussion on regulatory aspects related to flexible duplex operation for E-UTRAN", 3GPP TSG RAN Meeting #67, RP-150250, Mar. 2015, 8 pages.

Huawei, et al., "Motivation of New SI proposal: Evolving LTE with Flexible Duplex for Traffic Adaptation", 3GPP TSG RAN Meeting #63, RP-140062, Mar. 2014, 2 pages.

3rd Generation Partnership Project (3GPP), "Technical Specification Group Radio Access Network; Evolved Universal Terrestrial Radio Access (E-UTRA); Study on regulatory aspects for flexible duplex for E-UTRAN (Release 13)," 3GPP TR 36.882 V0.0.1, Jun. 2015, 9 pages.

\* cited by examiner

METHOD FOR TRANSMITTING PUCCH USING FDD FRAME IN WIRELESS COMMUNICATION SYSTEM AND DEVICE THEREFOR

CROSS-REFERENCE TO RELATED APPLICATIONS

This application is the National Stage filing under 35 U.S.C. 371 of International Application No. PCT/KR2016/008361, filed on Jul. 29, 2016, which claims the benefit of U.S. Provisional Application No. 62/208,796, filed on Aug. 23, 2015 and 62/330,220, filed on May 1, 2016, the contents of which are all hereby incorporated by reference herein in their entirety.

TECHNICAL FIELD

The present disclosure relates to wireless communication, and more particularly, to a method and apparatus for transmitting a physical uplink control channel (PUCCH) in a frequency division duplex (FDD) frame in a wireless communication system.

BACKGROUND ART

Compared to conventional half duplex communication in which time or frequency resources are divided orthogonally, full duplex communication doubles a system capacity in theory by allowing a node to perform transmission and reception simultaneously.

FIG. 1 is a conceptual view of a user equipment (UE) and a base station (BS) which support full duplex radio (FDR).

In the FDR situation illustrated in FIG. 1, the following three types of interference are produced.

Intra-Device Self-Interference:

Because transmission and reception take place in the same time and frequency resources, a desired signal and a signal transmitted from a BS or UE are received at the same time at the BS or UE. The transmitted signal is received with almost no attenuation at a reception (Rx) antenna of the BS or UE, and thus with much larger power than the desired signal. As a result, the transmitted signal serves as interference.

UE to UE Inter-Link Interference:

An uplink (UL) signal transmitted by a UE is received at an adjacent UE and thus serves as interference.

BS to BS Inter-Link Interference:

The BS to BS inter-link interference refers to interference caused by signals that are transmitted between BSs or heterogeneous BSs (pico, femto, and relay) in a heterogeneous network (HetNet) state and received by an Rx antenna of another BS.

DISCLOSURE

Technical Problem

An aspect of the present disclosure devised to solve the conventional problem is to provide a method for transmitting a physical uplink control channel (PUCCH) in a frequency division duplex (FDD) frame by a user equipment (UE) in a wireless communication system.

Another aspect of the present disclosure is to provide a UE for transmitting a PUCCH in an FDD frame in a wireless communication system.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, a method for transmitting a physical uplink control channel (PUCCH) in a frequency division duplex (FDD) frame by a user equipment (UE) in a wireless communication system may include transmitting the PUCCH in two subframes of the FDD frame. Each of the two subframes may include resource(s) for downlink reception in an uplink band. The two subframes may be contiguous.

The PUCCH may be transmitted in a physical resource block (PRB) with index 0 in a first slot of a first subframe of the two subframes, and a PRB with index 1 in a first slot of a second subframe of the two subframes.

The PUCCH may be transmitted in a PRB with index 1 in a first slot of a first subframe of the two subframes, and a PRB with index 0 in a first slot of a second subframe of the two subframes.

The PUCCH may be transmitted in a PRB with index 0 in a second slot of a first subframe of the two subframes, and a PRB with index 1 in a second slot of a second subframe of the two subframes.

The PUCCH may be transmitted in a PRB with index 1 in a second slot of a first subframe of the two subframes, and a PRB with index 0 in a second slot of a second subframe of the two subframes.

In another aspect of the present disclosure, a UE for transmitting a PUCCH in an FDD frame in a wireless communication system may include a transmitter, and a processor. The processor may control transmission of the PUCCH in two subframes of the FDD frame, and each of the two subframes may include resource(s) for downlink reception in an uplink band. The two subframes may be contiguous.

The processor may control transmission of the PUCCH in a PRB with index 0 in a first slot of a first subframe of the two subframes, and a PRB with index 1 in a first slot of a second subframe of the two subframes.

The processor may control transmission of the PUCCH in a PRB with index 1 in a first slot of a first subframe of the two subframes, and a PRB with index 0 in a first slot of a second subframe of the two subframes.

The processor may control transmission of the PUCCH in a PRB with index 0 in a second slot of a first subframe of the two subframes, and a PRB with index 1 in a second slot of a second subframe of the two subframes.

The processor may control transmission of the PUCCH in a PRB with index 1 in a second slot of a first subframe of the two subframes, and a PRB with index 0 in a second slot of a second subframe of the two subframes.

Advantageous Effects

Since a physical uplink control channel (PUCCH) is transmitted in a frequency division duplex (FDD) frame in which downlink (DL) resources for receiving a DL channel are allocated in an uplink (UL) band by a PUCCH allocation method according to an embodiment of the present disclosure, the PUCCH may be transmitted efficiently.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure.

BEST MODE FOR CARRYING OUT THE INVENTION

Figure 1:
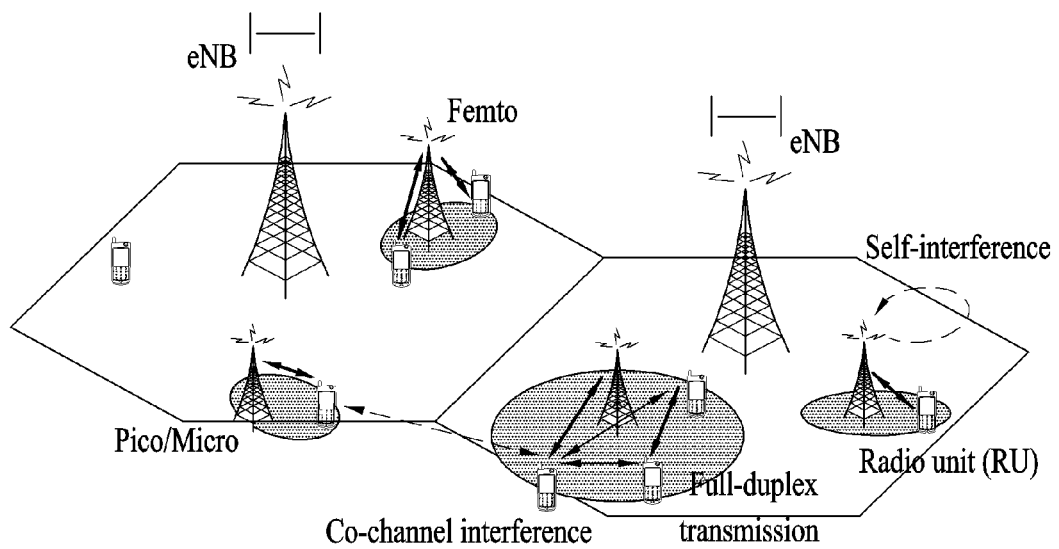
FIG. 1 is an exemplary view illustrating a network supporting a full duplex/half duplex communication operation scheme of a user equipment (UE), proposed by the present disclosure.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present invention from getting vaguer, structures and/or devices known to the public are skipped or can be represented as block diagrams centering on the core functions of the structures and/or devices.

Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on IEEE 802.16m system, contents of the present invention may be applicable to various kinds of other communication systems.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The following descriptions are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE employs OFDMA in DL and SC-FDMA in UL. And, LTE-A (LTE-Advanced) is an evolved version of 3GPP LTE.

Moreover, in the following description, specific terminologies are provided to help the understanding of the present invention. And, the use of the specific terminology can be modified into another form within the scope of the technical idea of the present invention.

Figure 2:
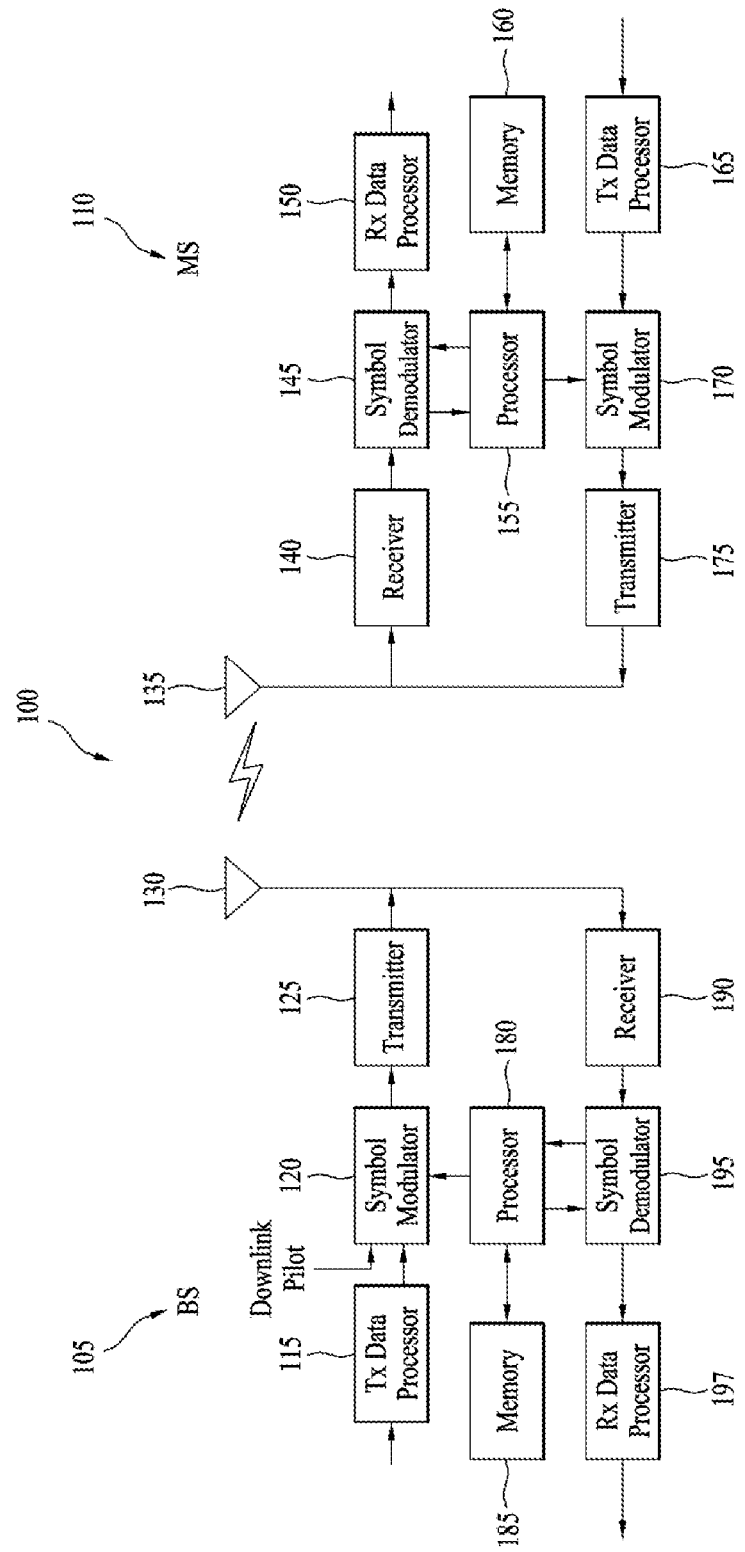
FIG. 2 is a block diagram for configurations of a base station (BS) 105 and a user equipment (UE) 110 in a wireless communication system 100.

FIG. 2 is a block diagram for configurations of a base station 105 and a user equipment 110 in a wireless communication system 100.

Although one base station 105 and one user equipment 110 (D2D user equipment included) are shown in the drawing to schematically represent a wireless communication system 100, the wireless communication system 100 may include at least one base station and/or at least one user equipment.

Referring to FIG. 2, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present invention supports an MIMO (multiple input multiple output) system. And, the base station 105 according to the present invention may support both SU-MIMO (single user-MIMO) and MU-MIMO (multi user-MIMO) systems.

In downlink, the transmitted data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmitted data processor 115 in the base station 105, respectively.

In the user equipment 110 in uplink, the transmitted data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present invention as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

Figure 3:
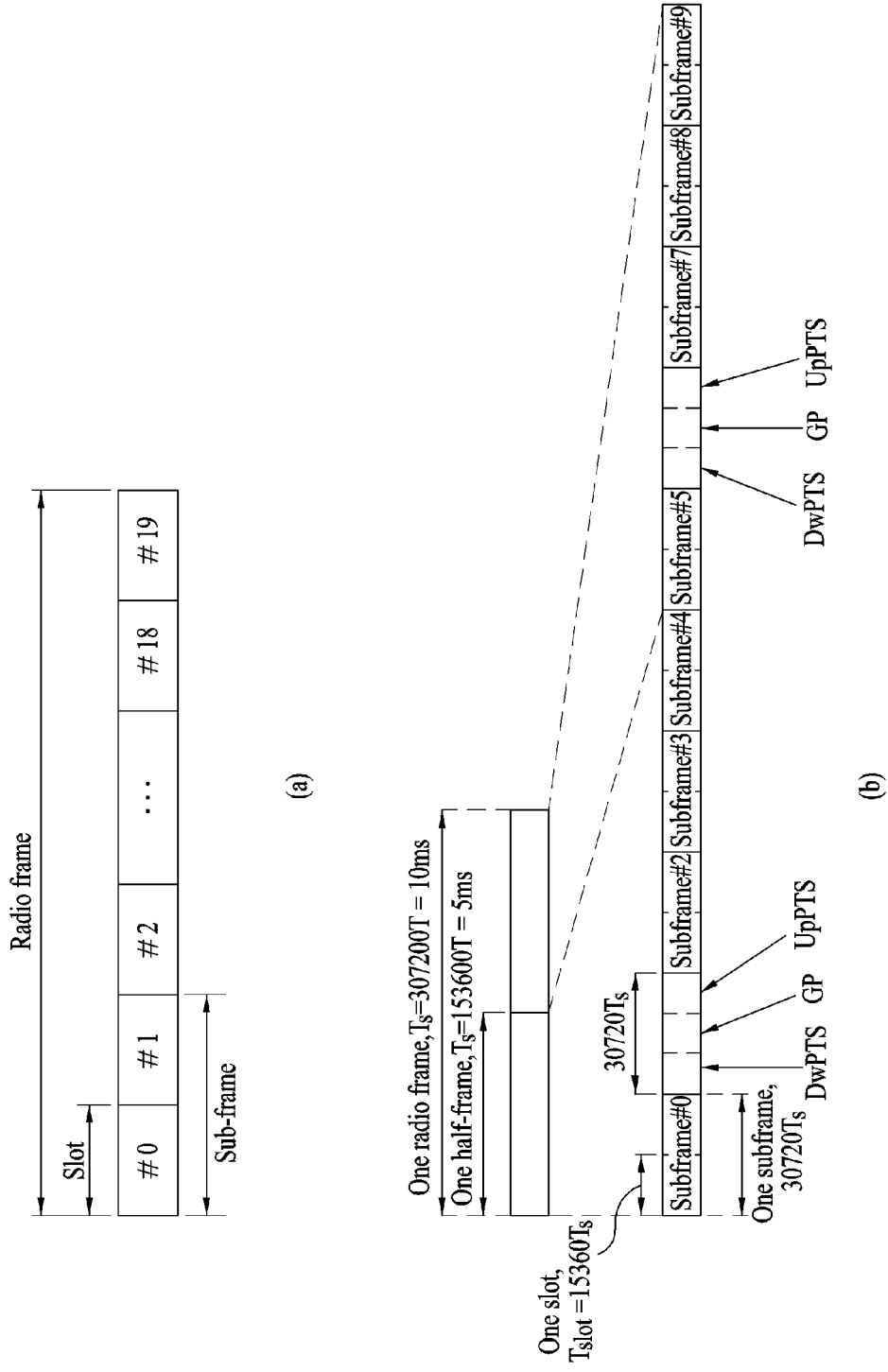
FIG. 3 is a view illustrating the structure of a radio frame used in a $3^{rd}$ generation partnership project long term evolution/long term evolution-advanced (3GPP LTE/LTE-A) system which is an example of a wireless communication system.

FIG. 3 is a diagram showing the structure of a radio frame used in a 3GPP LTE/LTE-A system which is an example of a wireless communication system.

As a general wireless transmission method, for wireless transmission between a base station and a wireless user equipment (UE) as wireless devices, transmission from the base station to the wireless UE is referred to as downlink transmission and transmission from the wireless UE to the base station is referred to as uplink transmission. A scheme for dividing radio resources between downlink transmission and uplink transmission is defined as "duplex". Bidirectional transmission and reception in a state of dividing a frequency band into a downlink transmission band and an uplink transmission band is referred to as frequency division duplex (FDD) and transmission and reception in a state of dividing a time-domain radio resources into downlink time duration resources and uplink time duration resources in the same frequency band is referred to as time division duplex (TDD).

In a cellular OFDM wireless packet communication system, an uplink (UL)/downlink (DL) data packet is transmitted on a subframe-by-subframe basis, and one subframe is defined as a predetermined time interval including a plurality of OFDM symbols. 3GPP LTE supports a type-1 radio frame structure applicable to frequency division duplex (FDD) and a type-2 radio frame structure applicable to time division duplex (TDD).

FIG. 3(a) illustrates the type-1 radio frame structure. A downlink radio frame is divided into ten subframes. Each subframe includes two slots in the time domain. The time required to transmit one subframe is defined as a transmission time interval (TTI). For example, a subframe may have a duration of 1 ms and one slot may have a duration of 0.5 ms. A slot may include a plurality of OFDM symbols in the time domain and a plurality of resource blocks (RBs) in the frequency domain. Since 3GPP LTE employs OFDMA for downlink, an OFDM symbol represents one symbol period. An OFDM symbol may be referred to as an SC-FDMA symbol or a symbol period. A resource block (RB), which is a resource allocation unit, may include a plurality of consecutive subcarriers in a slot.

The number of OFDM symbols included in one slot depends on the configuration of a cyclic prefix (CP). CPs are divided into an extended CP and a normal CP. For a normal CP configuring each OFDM symbol, a slot may include 7 OFDM symbols. For an extended CP configuring each OFDM symbol, the duration of each OFDM symbol is extended and thus the number of OFDM symbols included in a slot is smaller than in the case of the normal CP. For the extended CP, a slot may include, for example, 6 OFDM symbols. When a channel status is unstable as in the case of high speed movement of a UE, the extended CP may be used to reduce inter-symbol interference.

When the normal CP is used, each slot includes 7 OFDM symbols, and thus each subframe includes 14 OFDM symbols. In this case, the first three OFDM symbols of each subframe may be allocated to a physical downlink control channel (PDCCH) and the other OFDM symbols may be allocated to a physical downlink shared channel (PDSCH).

FIG. 3(b) illustrates the type-2 radio frame structure.

The type-2 radio frame includes two half frames, each of which has 5 subframes, a downlink pilot time slot (DwPTS), a guard period (GP), and an uplink pilot time slot (UpPTS). Each subframe includes two slots. The DwPTS is used for initial cell search, synchronization, or channel estimation in a UE, whereas the UpPTS is used for channel estimation in a base station and UL transmission synchronization in a UE. The GP is provided to cancel interference generated on UL due to multipath delay of a DL signal between DL and UL.

Each half frame includes 5 subframes, a subframe "D" is a subframe for downlink transmission, a subframe "U" is a subframe for uplink transmission, and a subframe "S" is a special subframe including a DwPTS (Downlink Pilot Time Slot), a guard period (GP) and a UpPTS (Uplink Pilot Time Slot). The DwPTS is used for initial cell search, synchronization, or channel estimation in a UE, whereas the UpPTS is used for channel estimation in a base station and UL transmission synchronization in a UE. The GP is provided to cancel interference generated in UL due to multipath delay of a DL signal between DL and UL.

The special subframe S is present in each half frame in the case of a 5-ms downlink-uplink switch-point period and is present only in a first half frame in the case of a 5-ms downlink-uplink switch-point period. Subframe indices 0 and 5 and DwPTS are used for only downlink transmission. A subframe immediately after the UpPTS and the special subframe is always used for uplink transmission. If multiple cells are aggregated, the UE may assume the same uplink-downlink configuration over all cells and the GPs of the special subframes in different cells overlap by at least 1456 Ts. The radio frame structures are merely examples, and various modifications may be made to the number of subframes included in a radio frame, the number of slots included in a subframe, or the number of symbols included in a slot.

[Table 1] below shows the configuration of the special frames (length of DwPTS/GP/UpPTS).

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

Table 2 below shows an uplink-downlink configuration in type-2 frame structure in a 3GPP LTE system.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to [Table 2], in the 3GPP LTE system, there are seven uplink-downlink configurations in the type-2 frame structure. The location or number of downlink subframes, special frames or uplink subframes may be changed according to configuration. Various embodiments of the present invention will hereinafter be described centering upon UL-DL configurations of a Type-2 frame structure shown in Table 2. The following Table 3 illustrates k values of TDD configurations 0~6.

TABLE 3

| TDD UL/DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 0 | | 7 | 4 | | | | | 7 | 4 | |
| 1 | | | 4 | | | 6 | | | 4 | 6 |
| 2 | | | 6 | | | | | | 6 | |
| 3 | 6 | | | | | | | | 6 | 6 |
| 4 | | | | | | | | | 6 | 6 |
| 5 | | | | | | | | | 6 | |
| 6 | 6 | | 4 | | | | | 7 | 4 | 6 |

HARQ-ACK received over a PHICH allocated to a UE at the subframe (i) in a Type-1 frame structure may be associated with PUSCH transmission at the subframe (i-4). In Type-2 frame structure UL/DL configurations 1~6, HARQ-ACK received over a PHICH allocated to the UE at the subframe (i) may be associated with PUSCH transmission at the subframe i-k (where k is shown in Table 3).

A UE HARQ-ACK procedure for use in the 3GPP LTE/LTE-A system will hereinafter be described. The present invention will be disclosed centering upon the UE HARQ-ACK procedure for use in the 3GPP LTE/LTE-A system.

TABLE 4

For Frame Structure type 2 UL/DL configuration 1-6, an HARQ-ACK received on the PHICH assigned to a UE in subframe i is associated with the PUSCH transmission in the subframe i-k as indicated by the table 3.
For Frame Structure type 2 UL/DL configuration 0, an HARQ-ACK received on the PHICH in the resource corresponding to $I_{PHICH} = 0$, assigned to a UE in subframe i is associated with the PUSCH transmission in the subframe i-k as indicated by the table 3.
If, for Frame Structure type 2 UL/DL configuration 0, an HARQ-ACK received on the PHICH in the resource corresponding to $I_{PHICH} = 1$, assigned to a UE in subframe i is associated with the PUSCH transmission in the subframe i-6.
The physical layer in the UE shall deliver indications to the higher layers as follows:
For downlink subframe i, if a transport block was transmitted in the associated PUSCH subframe then:
if ACK is decoded on the PHICH corresponding to the transport block in subframe i, ACK for that transport block shall be delivered to the higher layers;
else NACK for that transport block shall be delivered to the higher layers.
For downlink subframe i, in case of a retransmission in the associated PUSCH subframe, if a transport block was disabled in the associated PUSCH subframe then ACK for that transport block shall be delivered to the higher layers.

The PHICH assignment procedure for use in the 3GPP LTE/LTE-A system will hereinafter be described. The present invention will be disclosed centering upon the PHICH assignment procedure for use in the 3GPP LTE/LTE-A system.

TABLE 5

For PUSCH transmissions scheduled from serving cell in subframe n, a UE shall
determine the corresponding PHICH resource of serving cell c in subframe n + $k_{PHICH}$,
where $k_{PHICH}$ is always 4 for FDD and is given in following table 6 for TDD. For
subframe bundling operation, the corresponding PHICH resource is associated with the
last subframe in the bundle.
The PHICH resource is identified by the index pair ($n_{PHICH}^{group}$, $n_{PHICH}^{seq}$) where $n_{PHICH}^{group}$ is the
PHICH group number and $n_{PHICH}^{seq}$ is the orthogonal sequence index within the group as
defined by:
$n_{PHICH}^{group} = (I_{PRB\_RA} + n_{DMRS}) \bmod N_{PHICH}^{group} + I_{PHICH} N_{PHICH}^{group}$
$n_{PHICH}^{seq} = (\lfloor I_{PRB\_RA}/N_{PHICH}^{group} \rfloor + n_{DMRS}) \bmod 2N_{SF}^{PHICH}$
where
$n_{DMRS}$ is mapped from the cyclic shift for DMRS field (according to following table 6)
in the most recent PDCCH with uplink DCI format [4] for the transport block(s)
associated with the corresponding PUSCH transmission. $n_{DMRS}$ shall be set to zero, if
there is no PDCCH with uplink DCI format for the same transport block, and
if the initial PUSCH for the same transport block is semi-persistently scheduled, or
if the initial PUSCH for the same transport block is scheduled by the random access
response grant.
$N_{SF}^{PHICH}$ is the spreading factor size used for PHICH modulation as described in section
6.9.1 in [3].

$$I_{PRB\_RA} = \begin{cases} I_{PRB\_RA}^{lowest\_index} & \text{for the first } TB \text{ of a } PUSCH \text{ with associated } PDCCH \text{ or for the ease of no associated } PDCCH \text{ when the number of negatively acknowledged } TBs \text{ is not equal to the number of } TBs \text{ indicated in the most recent } PDCCH \text{ associated with the corresponding } PUSCH \\ I_{PRB\_RA}^{lowest\_index} + 1 & \text{for a second } TB \text{ of a } PUSCH \text{ with associated } PDCCH \end{cases}$$

where $I_{PRB\_RA}^{lowest\_index}$ is the lowest PRB index in the first slot of the corresponding PUSCH
transmission
$N_{PHICH}^{group}$ is the number of PHICH groups configured by higher layers as described in
section 6.9 of [3], $$I_{PHICH} = \begin{cases} 1 & \text{for } TDD\ UL/DL \text{ configuration 0 with } PUSCH \text{ transmission in subframe } n = 4 \text{ or } 9 \\ 0 & \text{otherwise} \end{cases}$$

TABLE 6

| TDD UL/DL Configuration | subframe index n | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | | 4 | 7 |

Figure 4:
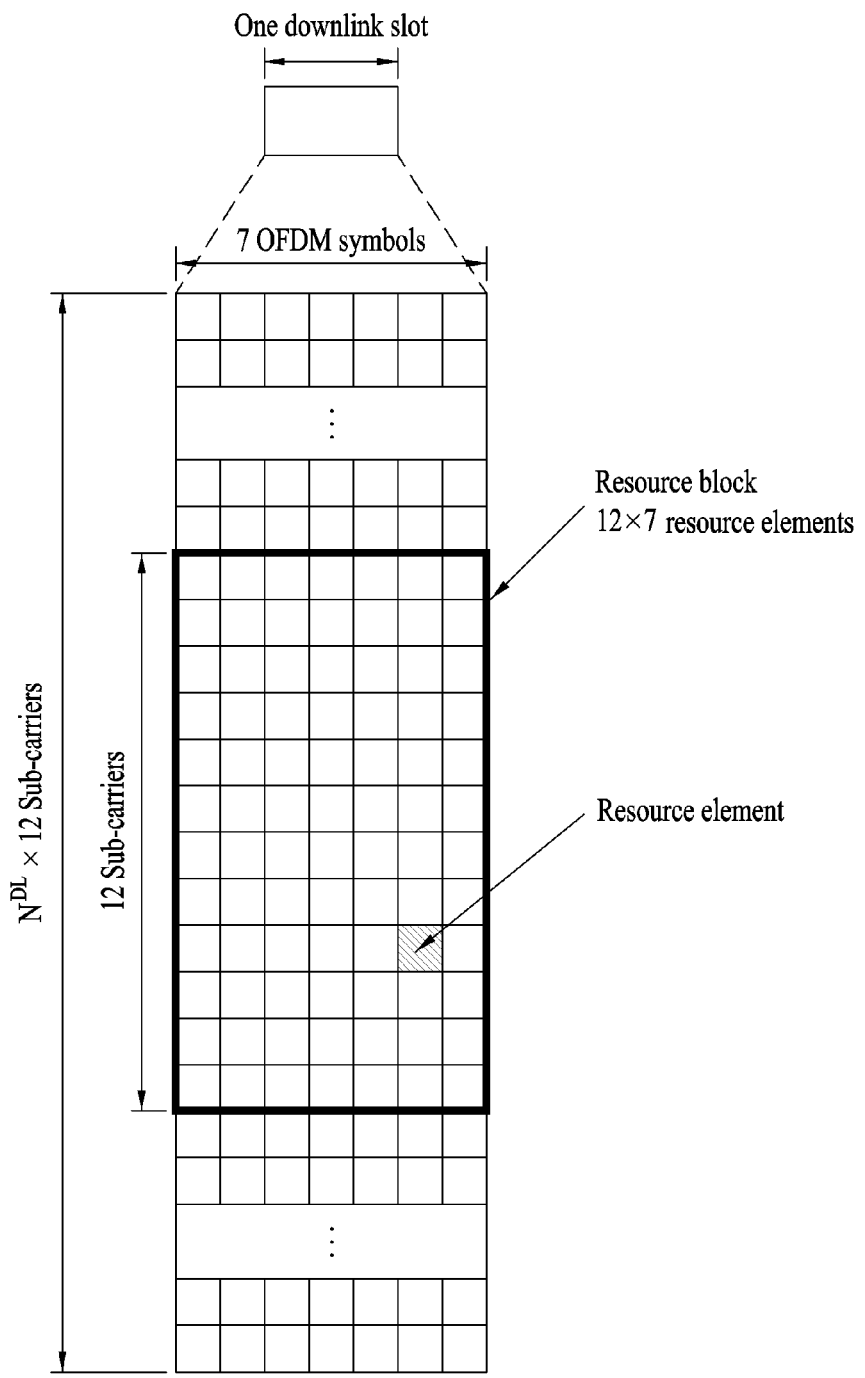
FIG. 4 is a view illustrating a resource grid of a downlink slot of a 3GPP LTE/LTE-A system which is an example of a wireless communication system.

FIG. 4 is a diagram showing a resource grid of a downlink slot of a 3GPP LTE/LTE-A system which is an example of a wireless communication system.

Referring to FIG. 4, a DL slot includes a plurality of OFDM symbols in the time domain. One DL slot includes 7 (or 6) OFDM symbols and an RB includes 12 subcarriers in the frequency domain. Each element of the resource grid is referred to as a Resource Element (RE). An RB includes 12×7 (6) REs. The number NRB of RBs included in a DL slot depends on a DL transmission bandwidth. A UL slot may have the same structure as a DL slot, except that an OFDM symbol is replaced with an SC-FDMA symbol.

Figure 5:
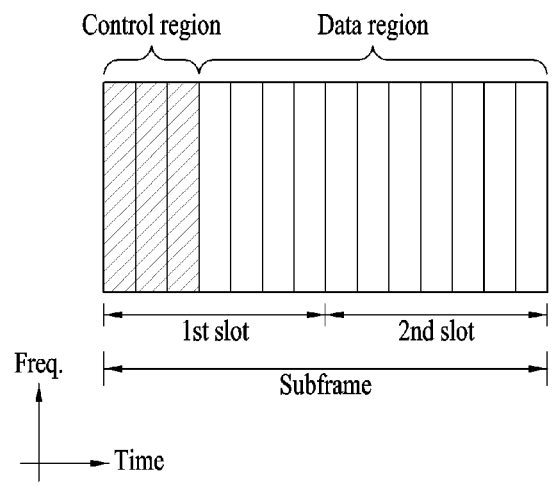
FIG. 5 is a view illustrating the structure of a downlink subframe used in a 3GPP LTE/LTE-A system which is an example of a wireless communication system.

FIG. 5 is a diagram showing the structure of a downlink subframe used in a 3GPP LTE/LTE-A system which is an example of a wireless communication system.

Referring to FIG. 5, a maximum of three (four) OFDM symbols located in a front portion of a first slot within a subframe corresponds to the control region to which a control channel is allocated. The remaining OFDM symbols correspond to the data region to which a physical downlink shared chancel (PDSCH) is allocated. Examples of downlink control channels used in LTE include a physical control format indicator channel (PCFICH), a physical downlink control channel (PDCCH), a physical hybrid ARQ indicator channel (PHICH), etc. The PCFICH is transmitted on a first OFDM symbol of a subframe and carries information regarding the number of OFDM symbols used for transmission of control channels within the subframe. The PHICH is a response to uplink transmission and carries a HARQ acknowledgment (ACK)/negative acknowledgment (NACK) signal.

Control information carried on the PDCCH is called downlink control information (DCI). As a DCI format, format 0 for uplink and formats 1, 1A, 1B, 1C, 1D, 2, 2A, 3 and 3A for downlink are defined. The DCI format selectively includes a hopping flag, RB allocation, modulation coding scheme (MCS), redundancy version (RV), new data indicator (NDI), transmit power control (TPC), cyclic shift demodulation reference signal (DMRS), channel quality information (CQI) request, HARQ process number, transmitted precoding matrix indicator (TPMI), precoding matrix indicator (PMI) confirmation, etc. according to usage thereof.

The PDCCH may deliver information about resource allocation and a transport format for a Downlink Shared Channel (DL-SCH), information about resource allocation and a transport format for an Uplink Shared Channel (UL- SCH), paging information of a Paging Channel (PCH), system information on the DL-SCH, information about resource allocation for a higher-layer control message such as a random access response transmitted on the PDSCH, a set of Tx power control commands for individual UEs of a UE group, a Tx power control command, Voice Over Internet Protocol (VoIP) activation indication information, etc. A plurality of PDCCHs may be transmitted in the control region. The UE may monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). The format of the PDCCH and the number of PDCCH bits are determined according to the number of CCEs. The base station determines a PDCCH format according to DCI to be transmitted to the UE and attaches cyclic redundancy check to control information. The CRC is masked by a unique Identifier (ID) (e.g. a Radio Network Temporary Identifier (RNTI)) according to the owner or usage of the PDCCH. If the PDCCH is destined for a specific UE, the CRC may be masked by an ID (e.g. a cell-RNTI (C-RNTI)) of the UE. If the PDCCH carries a paging message, the CRC may be masked by a paging ID (e.g. a Paging-RNTI (P-RNTI)). If the PDCCH carries system information, particularly, a System Information Block (SIB), the CRC may be masked by a system information ID (e.g. a System Information RNTI (SI-RNTI)). If the PDCCH is for a random access response, the CRC may be masked by a Random Access-RNTI (RA-RNTI).

Figure 6:
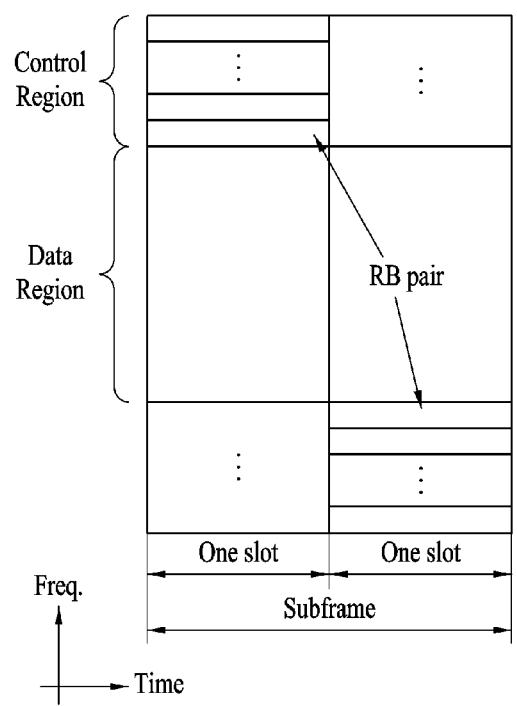
FIG. 6 is a view illustrating the structure of an uplink subframe used in a 3GPP LTE/LTE-A system which is an example of a wireless communication system.

FIG. 6 is a diagram showing the structure of an uplink subframe used in a 3GPP LTE/LTE-A system which is an example of a wireless communication system.

Referring to FIG. 6, the UL subframe includes a plurality (e.g., two) of slots. The slot may include SC-FDMA symbols, the number of which is changed according to CP length. The UL subframe is divided into a control region and a data region in the frequency domain. The data region includes a physical uplink shared channel (PUSCH) and is used to transmit a data signal such as voice. The control region includes a physical uplink control channel (PUCCH) and is used to transmit uplink control information (UCI). The PUCCH includes an RB pair located at both ends of the data region on the frequency axis and hops over a slot boundary.

The PUCCH can be used to transmit the following control information.

Scheduling Request (SR): This is information used to request a UL-SCH resource and is transmitted using an On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword (CW) and a 2-bit ACK/NACK signal is transmitted as a response to two downlink codewords.

Channel Quality Indicator (CQI): This is feedback information about a downlink channel Feedback information regarding MIMO includes a rank indicator (RI), a precoding matrix indicator (PMI), a precoding type indicator (PTI), etc. 20 bits are used per subframe.

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports seven formats according to information transmitted thereon.

Spectral efficiency of the FDR Tx/Rx system capable of simultaneously transmitting and receiving UL and DL signals on the same frequency band can be increased twice or less as compared to the legacy system for transmitting/receiving UL and DL signals through division of frequency or time, such that the FDR Tx/Rx system has been highlighted as a core technology of the next-generation 5G mobile communication system.

FDR based on a single frequency transmission band may be defined by a transmission resource configuration scheme capable of simultaneously performing transmission and reception through a single frequency transmission band from the viewpoint of an arbitrary wireless device. As a special example of the FDR, wireless communication between a general BS (or a repeater, a relay node, a remote radio head (RRH), etc.) and a UE can be represented as a Tx resource configuration scheme capable of simultaneously performing not only DL transmission and UL reception of the BS, but also DL reception and UL transmission of a UE through a single frequency Tx band. In another example, under D2D (Device-to-Device) direct communication between the UEs, such wireless communication may be represented as a Tx resource configuration scheme in which Tx and Rx operations between the UEs are simultaneously performed on the same frequency Tx band. Although the following description will disclose exemplary wireless Tx/Rx between a general BS and a UE indicating a wireless terminal and FDR associated technologies for convenience of description, the scope of the present invention may also be applied to a network UE capable of performing wireless Tx/Rx between a general BS and a UE, and may further include an example of D2D direct communication as necessary.

Figure 7:
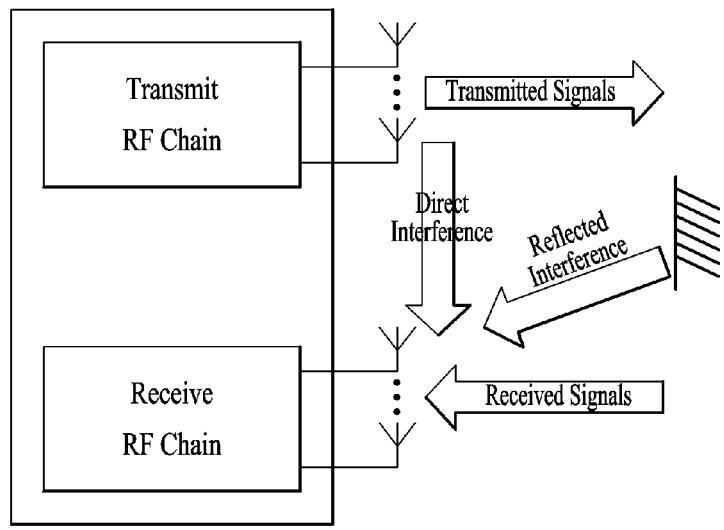
FIG. 7 is a view illustrating the concept of a transmission/reception link and self-interference (SI) in a full duplex radio (FDR) communication situation.

FIG. 7 is a diagram showing the concept of a transmission/reception link and self-interference (SI) in an FDR communication situation.

As shown in FIG. 7, SI may be divided into direct interference caused when a signal transmitted from a transmit antenna directly enters a receive antenna without path attenuation, and reflected interference reflected by peripheral topology, and the level thereof is dramatically greater than a desired signal due to a physical distance difference. Due to the dramatically large interference intensity, efficient SI cancellation is necessary to operate the FDR system.

To effectively operate the FDR system, self-IC requirements with respect to the maximum transmission power of devices (in the case where FDR is applied to a mobile communication system (BW=20 MHz)) may be determined as illustrated in [Table 7] below.

TABLE 7

| Node Type | Max. Tx Power ($P_A$) | Thermal Noise. (BW = 20 MHz) | Receiver NF | Receiver Thermal Noise Level | Self-IC Target ($P_A$- TN-NF) |
|---|---|---|---|---|---|
| Macro eNB | 46 dBm | −101 dBm | 5 dB (for eNB) | −96 dBm | 142 dB |
| Pico eNB | 30 dBm | | | | 126 dB |
| Femto eNB, WLAN AP | 23 dBm | | | | 119 dB |
| UE | 23 dBm | | 9 dB (for UE) | −92 dBm | 115 dB |

Referring to Table 7, it may be noted that to effectively operate the FDR system in a 20-MHz BW, a UE needs 119-dBm Self-IC performance. A thermal noise value may be changed to $N_{0,BW}$=−174 dBm+10×$\log_{10}$ (BW) according to the BW of a mobile communication system. In Table 7, the thermal noise value is calculated on the assumption of a 20-MHz BW. In relation to Table 3, for Receiver Noise Figure (NF), a worst case is considered referring to the 3GPP specification requirements. Receiver Thermal Noise Level is determined to be the sum of a thermal noise value and a receiver NF in a specific BW.

Types of Self-IC Schemes and Methods for Applying the Self-IC Schemes

Figure 8:
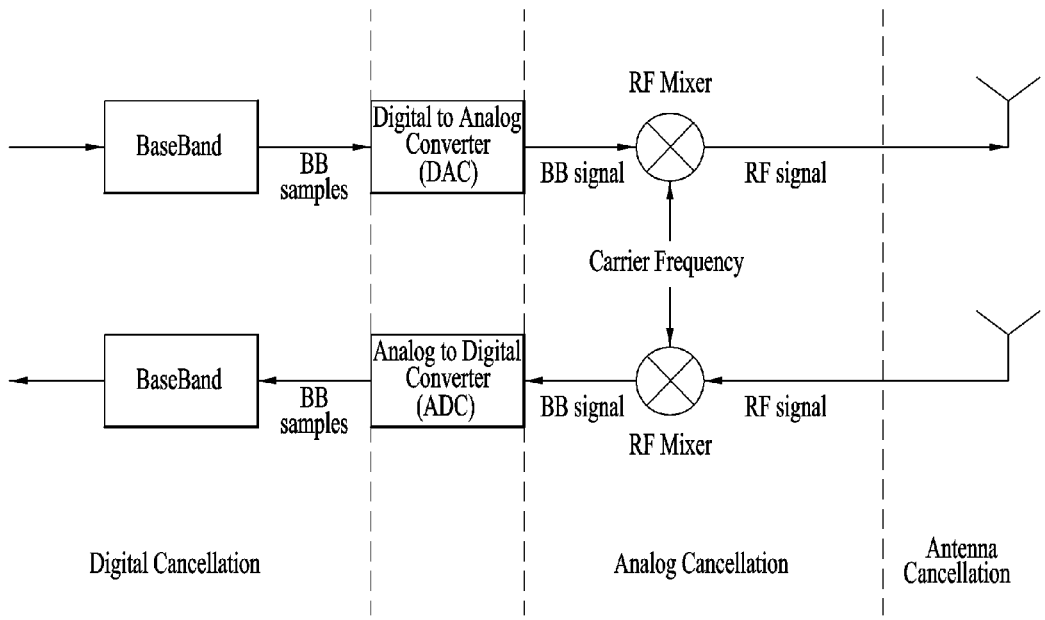
FIG. 8 is a view illustrating positions at which three self-interference cancellation (Self-IC) schemes are applied, at a radio frequency (RF) transmission (Tx) and reception (Rx) end (or an RF front end) of a device.

FIG. 8 is a view illustrating positions at which three Self-IC schemes are applied, in a Radio Frequency (RF) Tx and Rx end (or an RF front end) of a device. Now, a brief description will be given of the three Self-IC schemes.

Antenna Self-IC:

Antenna Self-IC is a Self-IC scheme that should be performed first of all Self-IC schemes. SI is cancelled at an antenna end. Most simply, transfer of an SI signal may be blocked physically by placing a signal-blocking object between a Tx antenna and an Rx antenna, the distance between antennas may be controlled artificially, using multiple antennas, or a part of an SI signal may be canceled through phase inversion of a specific Tx signal. Further, a part of an SI signal may be cancelled by means of multiple polarized antennas or directional antennas.

Analog Self-IC:

Interference is canceled at an analog end before an Rx signal passes through an Analog-to-Digital Convertor (ADC). An SI signal is canceled using a duplicated analog signal. This operation may be performed in an RF region or an Intermediate Frequency (IF) region. SI signal cancellation may be performed in the following specific method. A duplicate of an actually received SI signal is generated by delaying an analog Tx signal and controlling the amplitude and phase of the delayed Tx signal, and subtracted from a signal received at an Rx antenna. However, due to the analog signal-based processing, the resulting implementation complexity and circuit characteristics may cause additional distortion, thereby changing interference cancellation performance significantly.

Digital Self-IC:

Interference is canceled after an Rx signal passes through an ADC. Digital Self-IC covers all IC techniques performed in a baseband region. Most simply, a duplicate of an SI signal is generated using a digital Tx signal and subtracted from an Rx digital signal. Or techniques of performing precoding/postcoding in a baseband using multiple antennas so that a Tx signal of a UE or an eNB may not be received at an Rx antenna may be classified into digital Self-IC. However, since digital Self-IC is viable only when a digital modulated signal is quantized to a level enough to recover information of a desired signal, there is a need for the prerequisite that the difference between the signal powers of a designed signal and an interference signal remaining after interference cancellation in one of the above-described techniques should fall into an ADC range, to perform digital Self-IC.

Figure 9:
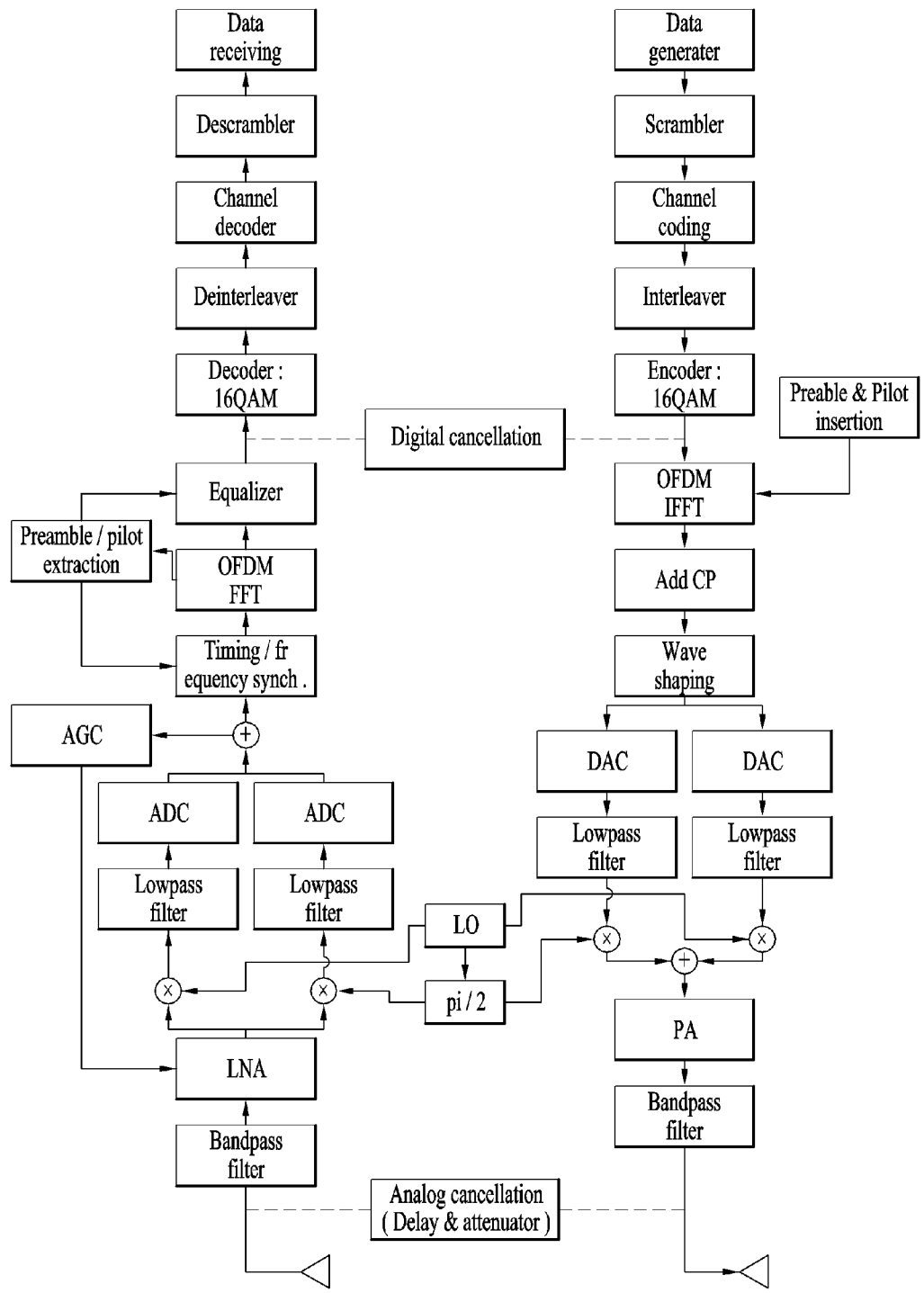
FIG. 9 is a block diagram of a Self-IC device in a proposed communication apparatus in an orthogonal frequency division multiplexing (OFDM) communication environment based on FIG. 8.

FIG. 9 is a block diagram of a Self-IC device in a proposed communication apparatus in an OFDM communication environment based on FIG. 8.

While FIG. 9 shows that digital Self-IC is performed using digital SI information before Digital to Analog Conversion (DAC) and after ADC, it may be performed using a digital SI signal after Inverse Fast Fourier Transform (IFFT) and before Fast Fourier Transform (FFT). Further, although FIG. 9 is a conceptual view of Self-IC though separation of a Tx antenna from an Rx antenna, if antenna Self-IC is performed using a single antenna, the antenna may be configured in a different manner from in FIG. 5.

The 3GPP LTE system operates in a predetermined fixed UL/DL band in both TDD and FDD, as illustrated in [Table 8] below. While a TDD configuration may be determined cell-specifically in TDD, predetermined UL and DL bands are located in different frequency bands, each band serving only one of the usages of UE transmission and BS transmission so that a signal may not be transmitted in the other band than defined for the signal in FDD. [Table 8] lists E-UTRA frequency bands.

TABLE 8

| E-UTRA Operating Band | Uplink (UL) operating band BS receive UE transmit $F_{UL\_low}$-$F_{UL\_high}$ | Downlink (DL) operating band BS transmit UE receive $F_{DL\_low}$-$F_{DL\_high}$ | Duplex Mode |
|---|---|---|---|
| 1 | 1920 MHz-1960 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894 MHz | FDD |
| 6[1] | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |

TABLE 8-continued

| E-UTRA Operating Band | Uplink (UL) operating band BS receive UE transmit $F_{UL\_low}$-$F_{UL\_high}$ | Downlink (DL) operating band BS transmit UE receive $F_{DL\_low}$-$F_{DL\_high}$ | Duplex Mode |
|---|---|---|---|
| 9 | 1749.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-1447.9 MHz | 1475.9 MHz-1495.9 MHz | FDD |
| 12 | 699 MHz-716 MHz | 729 MHz-746 MHz | FDD |
| 13 | 777 MHz-787 MHz | 746 MHz-756 MHz | FDD |
| 14 | 788 MHz-798 MHz | 758 MHz-768 MHz | FDD |
| 15 | Reserved | Reserved | FDD |
| 16 | Reserved | Reserved | FDD |
| 17 | 704 MHz-716 MHz | 734 MHz-746 MHz | FDD |
| 18 | 815 MHz-830 MHz | 860 MHz-875 MHz | FDD |
| 19 | 830 MHz-845 MHz | 875 MHz-890 MHz | FDD |
| 20 | 832 MHz-862 MHz | 791 MHz-821 MHz | |
| 21 | 1447.9 MHz-1462.9 MHz | 1495.9 MHz-1510.9 MHz | FDD |
| 24 | 1626.5 MHz-1660.5 MHz | 1525 MHz-1559 MHz | FDD |
| ... | | | |
| 33 | 1900 MHz-1920 MHz | 1900 MHz-1920 MHz | TDD |
| 34 | 2010 MHz-2025 MHz | 2010 MHz-2025 MHz | TDD |
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |
| 41 | 2496 MHz-2690 MHz | 2496 MHz-2690 MHz | TDD |
| 42 | 3400 MHz-3600 MHz | 3400 MHz-3600 MHz | TDD |
| 43 | 3600 MHz-3800 MHz | 3600 MHz-3800 MHz | TDD |

Note:
[1] Band 6 is not applicable.

However, an actual data environment for a UE is characterized by asymmetric data traffic, and DL data traffic occupies a larger proportion than UL data traffic in most communication environments. It has been reported that the ratio between the amount of UL traffic and the amount of DL traffic is 1:9. In this asymmetric data traffic environment, an FDD-LTE operation based on fixed frequency allocations for UL transmission and DL transmission as illustrated in [Table 8] above may decrease resource utilization. To avert this problem, a Flexible FDD wireless transmission scheme has been proposed as an initial stage for a full duplex radio (FDR) system.

Flexible FDD is a technology seeking to increase resource use efficiency adaptively to a UE's traffic environment by using a UL band as a DL band for a specific time in light of release of regulations on operations of an FDD system according to actual asymmetric data traffic characteristics. The legacy FDD-LTE wireless transmission scheme and the Flexible FDD wireless transmission scheme are compared in terms of resource use efficiency in FIG. 10.

Figure 10:
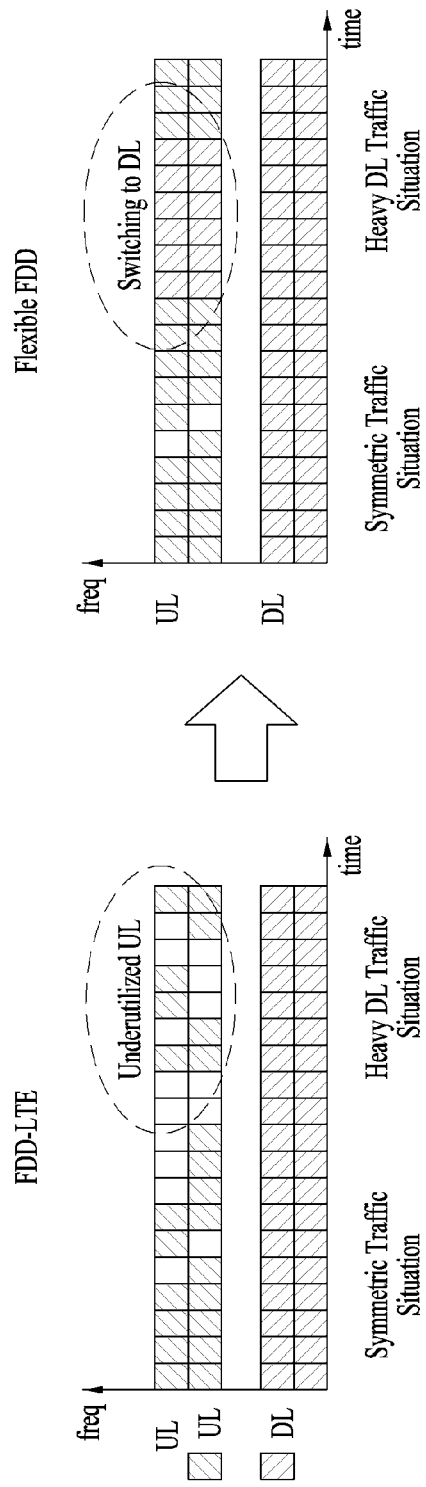
FIG. 10 is a view comparing a legacy frequency division duplex-long term evolution (FDD-LTE) wireless transmission scheme with a Flexible FDD wireless transmission scheme in terms of resource use efficiency.

FIG. 10 is a view illustrating a comparison between the legacy FDD-LTE wireless transmission scheme and the Flexible FDD wireless transmission scheme (a symmetric traffic situation and a heavy DL data traffic situation) in terms of resource use efficiency.

As illustrated in FIG. 10, most of DL and UL resources are used in the symmetric data traffic environment, thereby increasing resource efficiency. On the contrary, it is apparent from FIG. 10 that FDD of the legacy LTE system (FDD-LTE) wastes frequency resources due to the existence of unused resources in the heavy DL data traffic environment. To overcome the problem of decreased resource use efficiency, UL frequency resources may be used as frequency resources for DL transmission at a specific time. Thus, resource efficiency may be increased in the heavy DL data traffic environment. This is illustrated in detail along with buffer statuses for transmission in the Flexible FDD wireless transmission scheme in FIG. 11.

Figure 11:
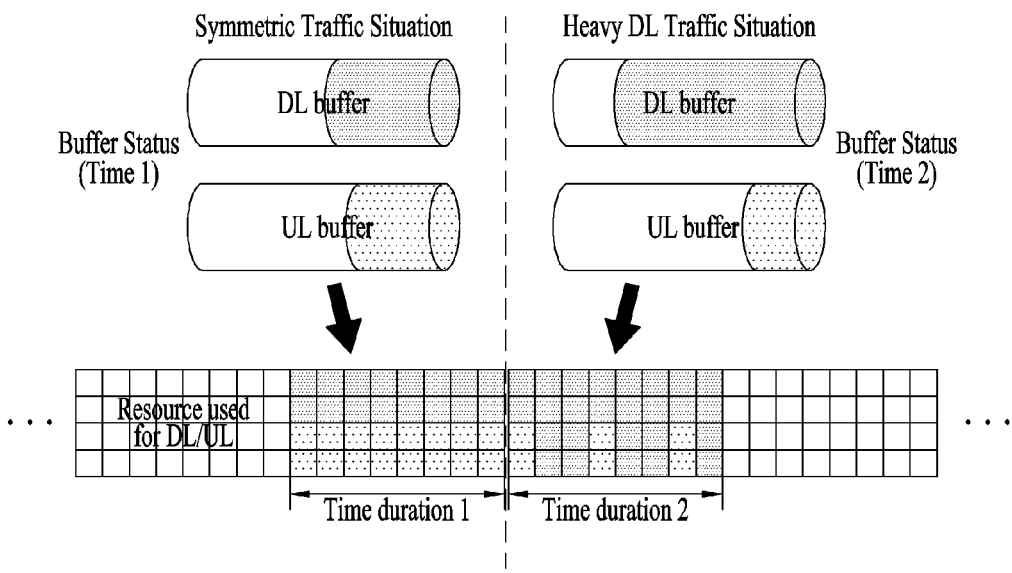
FIG. 11 is a view illustrating resource utilization in the Flexible FDD scheme.

FIG. 11 is a view illustrating resource utilization in the Flexible FDD scheme.

In FIG. 11, resource efficiency may be increased by using UL frequency resources as DL resources for DL transmission at a specific time in the heavy DL traffic environment, compared to the symmetric traffic situation.

As illustrated in FIG. 11, the Flexible FDD wireless transmission scheme refers to flexible configuration of DL frequency resources and UL frequency resources according to each service or application program. Herein, time resources may be configured in units of a time slot including one or more transmission symbols, a subframe, or a frame. Thus, wireless transmission resource allocation optimized for the characteristics of individual wireless terminal-wise services and applications may be supported, and total frequency use efficiency within any BS coverage may be increased, as well.

Figure 12:
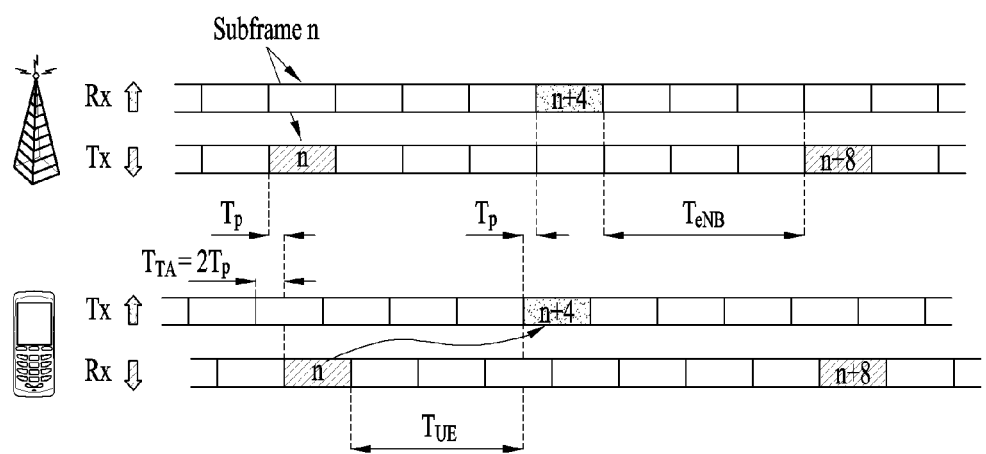
FIG. 12 is a view illustrating hybrid automatic repeat request (HARQ) timings in an FDD-LTE system.

FIG. 12 is a view illustrating HARQ timings in an FDD-LTE system.

In the legacy FDD-LTE system, since DL transmission and UL transmission take place simultaneously (in subframe n), a processing delay of 4 is fixedly involved in transmission of a control channel carrying a hybrid automatic repeat request (HARQ) feedback. Therefore, the HARQ feedback may be transmitted in subframe n+4, and a retransmission caused by a negative acknowledgment (NACK) is performed after subframe n+8.

In the Flexible FDD wireless transmission scheme, a UL band is used for DL transmission at a specific time, which may make UL transmission after subframe n+4 impossible. Thus, it is obvious that the HARQ feedback timing and the average delay of transmission of a control channel in the legacy FDD is increased to more than 4 subframes. Accordingly, there is a need for changing the HARQ feedback timing.

The present disclosure proposes techniques of effectively applying the Flexible FDD wireless transmission scheme to wireless transmission between a BS and a UE. It is apparent that the term BS as used throughout the present disclosure covers relay node, remote radio head (RRH), and so on. The present disclosure proposes frame structures suitable for the Flexible FDD wireless transmission scheme, and related HARQ feedback timings.

The present disclosure proposes that for implementation of the Flexible FDD wireless transmission scheme, the whole or part of a UL band allocated by a system in an FDD frame structure is allocated as a DL band by BS scheduling. For this purpose, it is necessary to additionally describe that if a Flexible FDD mode is operated with respect to [Table 8] in the current 3GPP LTE/LTE-A standards, a part of a band allocated as a UL band by a system may be used for a DL at a specific time, and thus a guard band (GB) may also be configured in the band allocated as the UL band by the system. In regard to this proposal, specific embodiments will be described below.

Embodiment 1

In Embodiment 1 of the present disclosure, in order to design a resource structure for a radio transmission frame dedicated to the Flexible FDD wireless transmission scheme, a UL band is divided into two or more bands, and the two or more bands are allocated as a combination of DL/UL/GB regions.

For the Flexible FDD wireless transmission scheme, a whole UL band may be used for a DL. Compared to the legacy FDD-LTE wireless transmission scheme in which a UL transmission is always possible and thus an HARQ feedback may be transmitted after four subframes, the timing of transmitting control channel information (including HARQ) for a DL transmission should be changed as in a TDD-LTE wireless transmission scheme. To solve this problem, a method for maintaining a partial band corresponding to legacy UL transmission of a PUSCH/PUCCH for UL transmission, and changing the remaining band for DL transmission to implement the Flexible FDD wireless transmission scheme is proposed.

More specifically, for the Flexible FDD wireless transmission scheme, a UL band may be divided into subbands, some subband may be configured for UL transmission, and another subband may be configured for DL reception, for flexible duplex. A GB may be configured in consideration of out-of-band (OOB) interference between the two subbands. Herein, to facilitate implementation, the length of the GB may be determined in consideration of the strength of interference between the adjacent bands. Further, when a technique of reducing OOB interference (e.g., a new waveform technique such as filter bank multi-carrier (FBMC) or generalized frequency division multiplexing (GFDM), or a digital filtering technique in a baseband) and a technique of estimating and cancelling OOB interference are applied, the length of the GB may be determined in consideration of the strength of interference between the adjacent bands at the time of applying the techniques.

Figure 13:
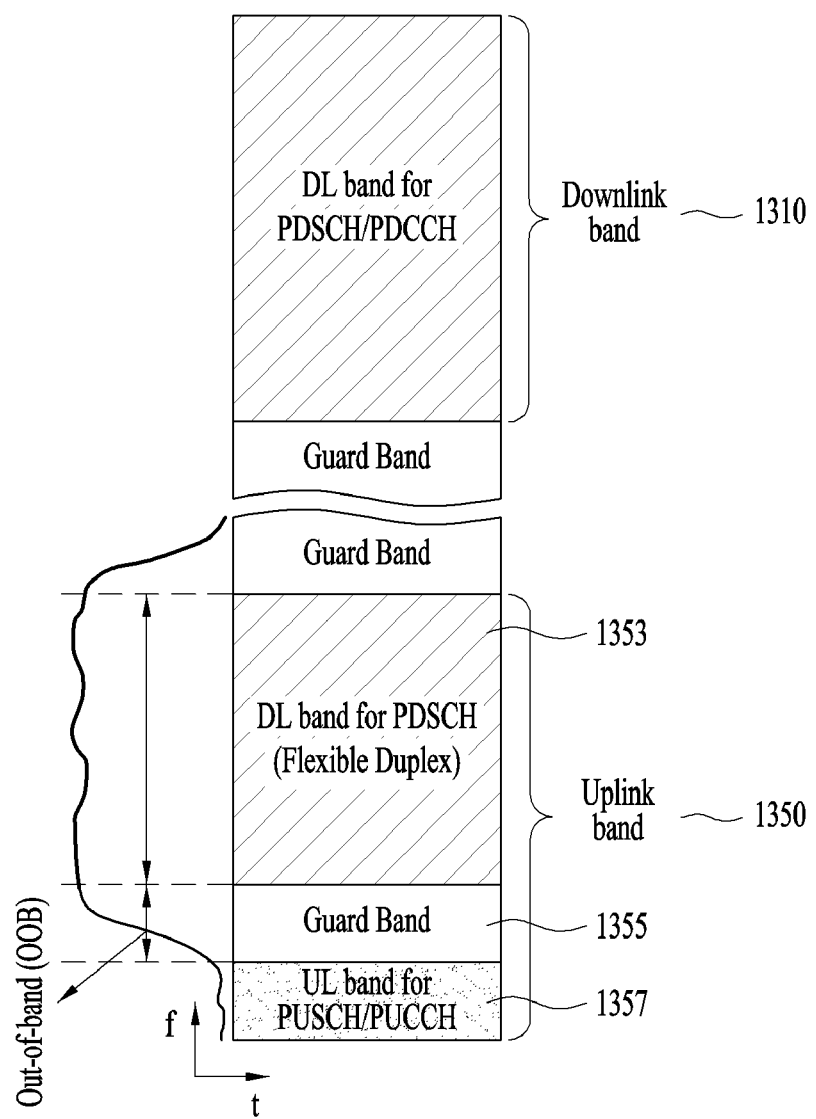
FIG. 13 is a view illustrating an exemplary Flexible FDD wireless transmission scheme having a frame structure in which an uplink band allocated by a system is divided into a total of three subbands in the order of a downlink band/guard band/uplink band (DL/GB/UL).

FIG. 13 is a view illustrating an exemplary Flexible FDD wireless transmission scheme having a frame structure in which a UL band allocated by a system is divided into a total of three subbands in the order of DL/GB/UL.

Referring to FIG. 13, an FDD frame is allocated as a DL band 1310 and a UL band 1350 by a system. In the case of a Flexible FDD frame, a part of the UL band 1350 (a frequency band adjacent to the DL band) is converted to a DL band 1350, for flexible duplex, and thus a UE may receive a DL signal in the DL band 1350 in FIG. 13. Another part of the UL band 1350 (a frequency band farthest from the DL band 1310) is used as a UL band 1357 so that control information may be transmitted in the UL band 1357. In FIG. 13, the band 1357 is shown only as a UL band for a PUCCH carrying control information and/or a PUSCH, by way of example.

As described above, since a UL transmission and a DL reception take place simultaneously in adjacent bands in the UL band 1350, OOB interference occurs. To prevent the OOB interference, a GB 1355 is interposed between the respective bands for UL transmission and DL reception in the UL band. The bands may be configured in a different order (e.g., UL/GB/DL) or combination from that illustrated in FIG. 13. Further, in FIG. 13, OOB interference that the DL band 1353 causes to the UL band 1357 in the UL band 1350 is described with respect to a BS.

Embodiment 2

In Embodiment 2 of the present disclosure, if a whole UL band is used as a DL band, in order to design a resource structure for a radio transmission frame dedicated to the Flexible FDD wireless transmission scheme, a guard time (GT) may be configured for a next UL transmission.

Compared to the FDD-LTE wireless transmission scheme, a special subframe is interposed between a DL subframe and a UL subframe due to the propagation characteristics of signal transmission in a TDD-LTE wireless transmission scheme. To prevent overlap between a transmission period and a reception period, caused by a timing advanced mechanism for radio propagation delay and UL reception synchronization in switching from a DL subframe to a UL subframe on a link between a BS and a UE, it is necessary to secure a GT equal to or longer than the round trip delay of the link in the special frame. To support the GT, the special subframe is defined and includes DL transmission symbols, GT symbols, and UL transmission symbols.

If a DL signal is transmitted in a UL band at a specific time, for the Flexible FDD wireless transmission scheme, there is a need for securing a GT equal to or longer than the round trip delay of a corresponding link, for a UL transmission in a following UL band as in the legacy TDD-LTE system.

Embodiment 2-1

Figure 14:
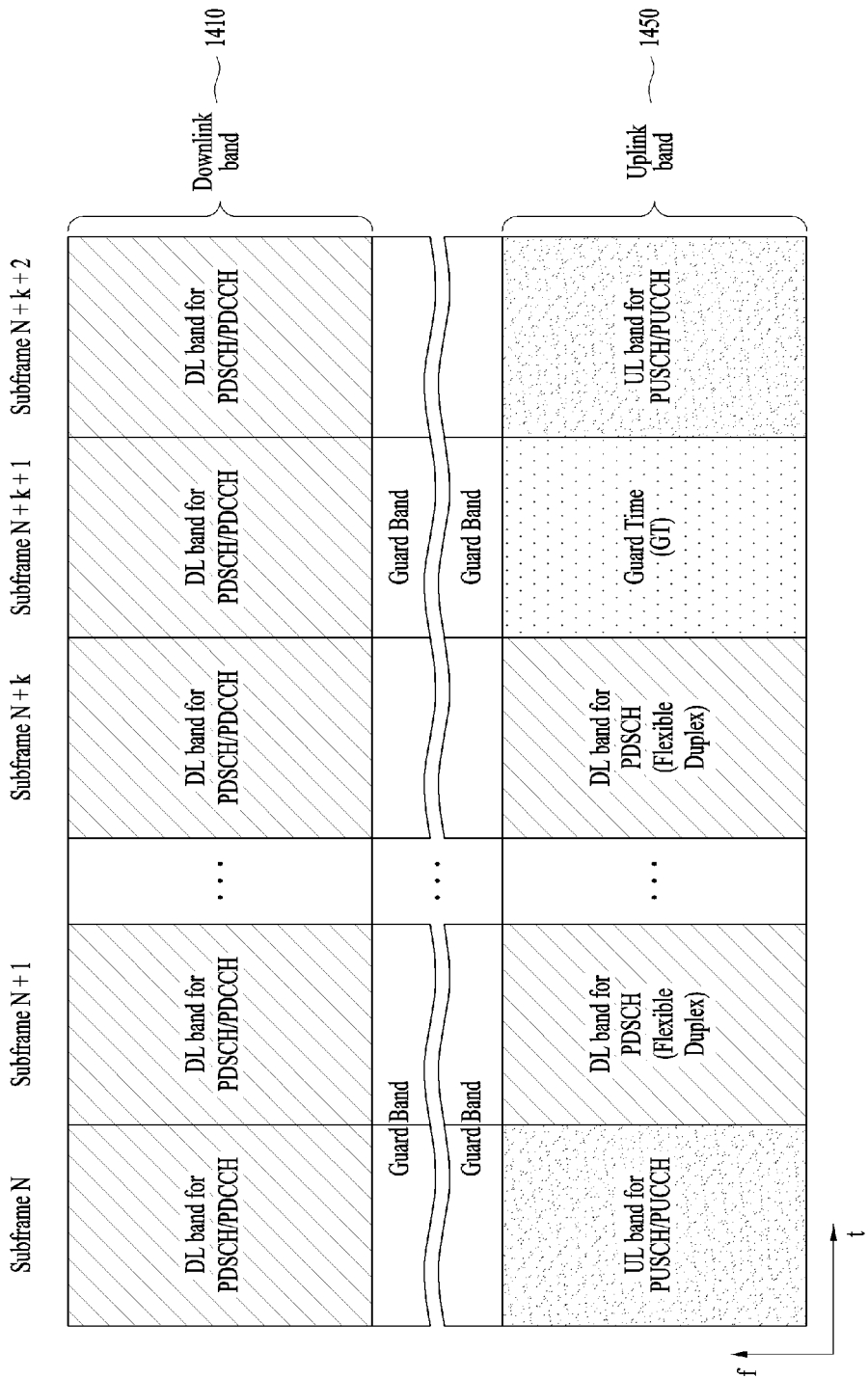
FIG. 14 is a view illustrating an exemplary method for configuring a downlink band/guard time/uplink band (DL/GT/UL) in this order by using three contiguous subframes of an uplink band.

FIG. 14 is a view illustrating an exemplary method for configuring a DL/GT/UL in this order by using three contiguous subframes of a UL band.

In a sub-embodiment of Embodiment 2, a whole UL band 1450 may be configured as a DL band for DL transmission during a specific time period (e.g., subframe N+1 to subframe N+k for transmission in k subframes). Subsequently, a GT may be configured during the time period of subframe N+k+1.

Embodiment 2-2

Figure 15:
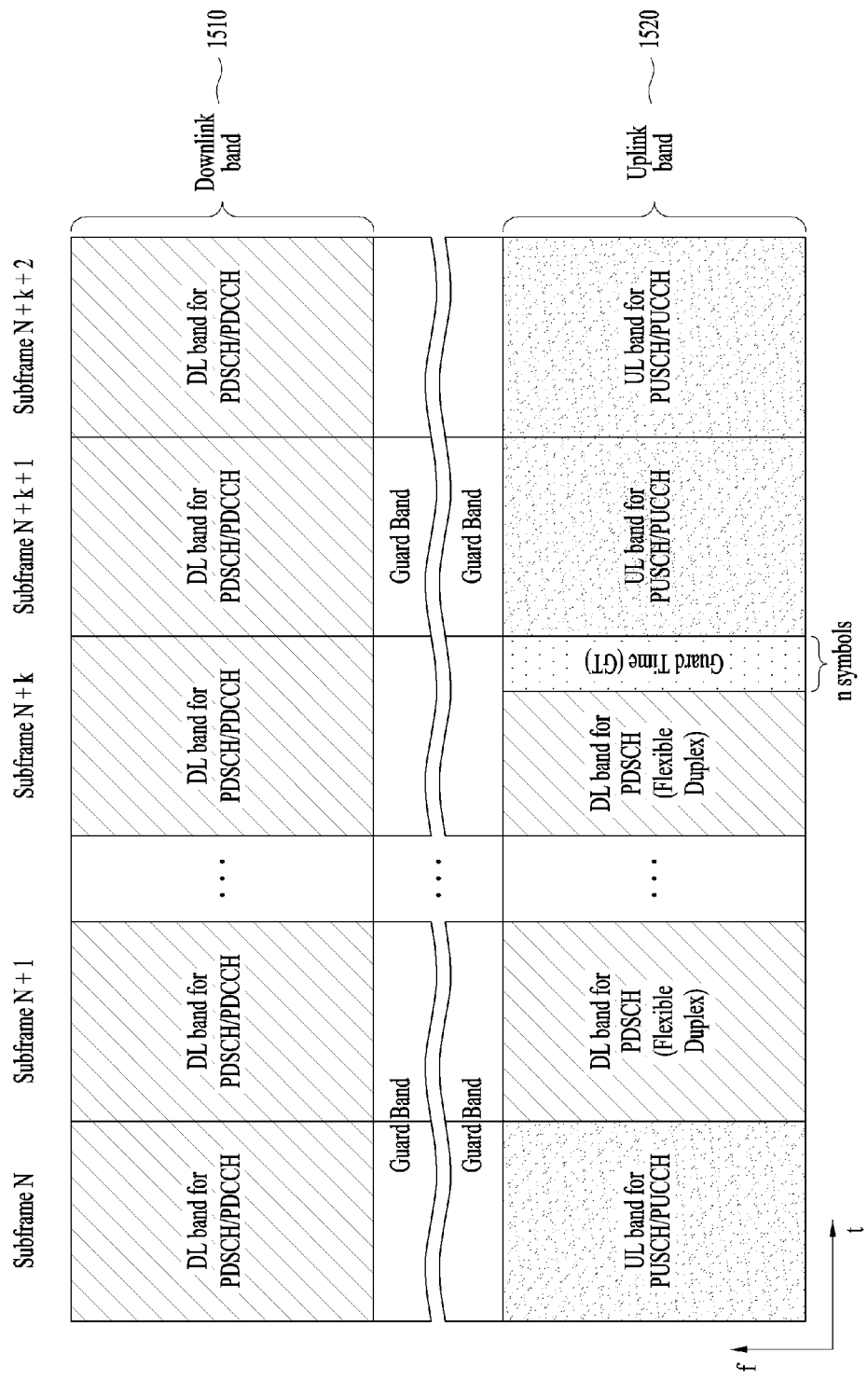
FIG. 15 is a view illustrating an exemplary method for configuring a DL/GT/UL by using two contiguous subframes of an uplink band.

FIG. 15 is a view illustrating an exemplary method for configuring a DL/GT/UL by using two contiguous subframes of a UL band.

Referring to FIG. 15, for example, to reduce a frequency efficiency decrease caused by the existence of a GT, a few last symbols of a last DL subframe (subframe N+k in FIG. 15) configured in a UL band 1520 may be configured as a GT. The number of symbols used for the GT is 1 or larger, and may be up to the number of symbols included in a subframe (e.g., 14 in the LTE system).

Embodiment 3

In Embodiment 3 of the present disclosure, the last symbol of a UL band may be allocated for sounding reference signal (SRS) transmission, in order to design a resource structure for a radio transmission frame dedicated to the Flexible FDD wireless transmission scheme. An SRS transmission based on specific SRS scheduling may be needed for backward compatibility with the legacy FDD-TDD wireless transmission schemes. For this purpose, the last symbol of a UL band as proposed in the frame structures of Embodiment 1 and Embodiment 2 may be allocated for SRS transmission.

Figure 16A:
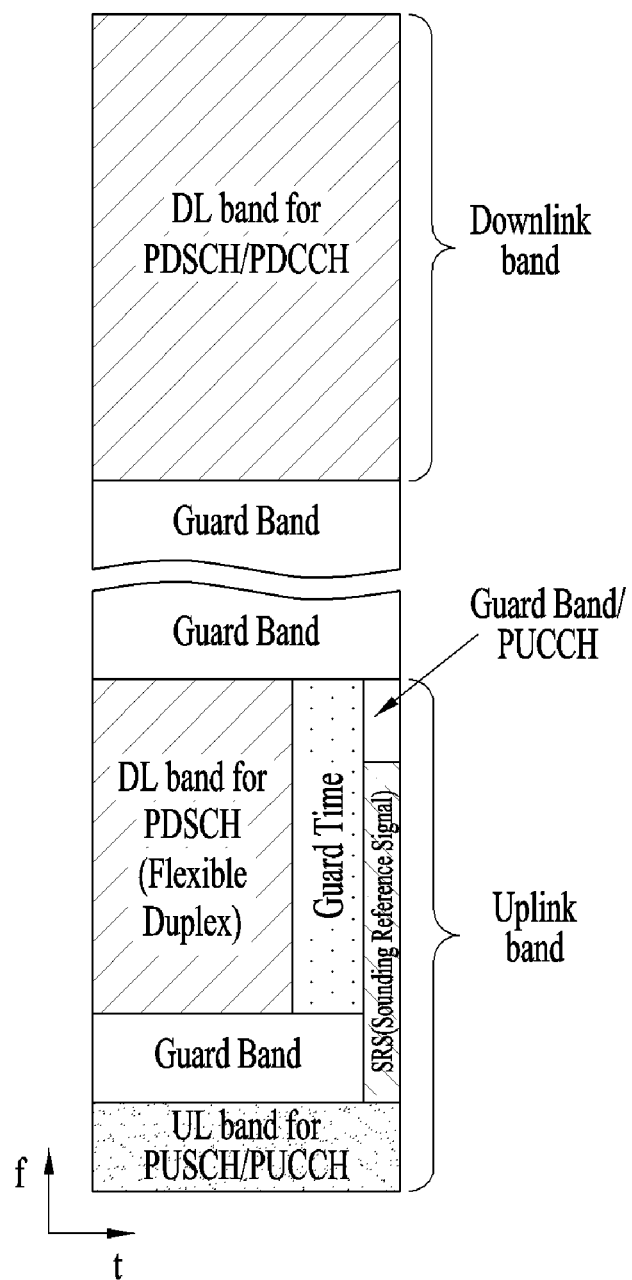
FIGS. 16A and 16B are views illustrating allocation of the last symbol of an uplink band for sounding reference signal (SRS) transmission based on examples of Embodiment 1 and Embodiment 2, respectively.
Figure 16B:
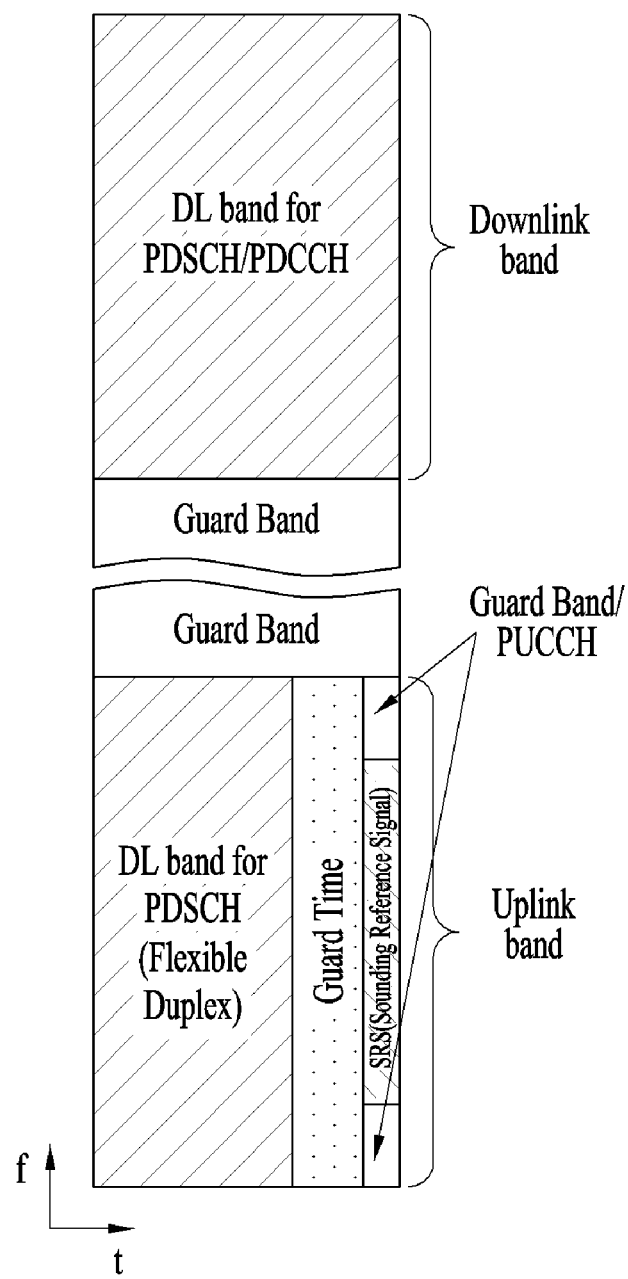

FIGS. 16A and 16B are views illustrating allocation of the last symbol of a UL band for SRS transmission based on examples of Embodiment 1 and Embodiment 2, respectively.

In FIGS. 16A and 16B, the last symbol of a UL band is allocated for SRS transmission and a GT is configured to prevent overlap between a transmission period and a reception period for the SRS transmission and DL reception in the examples of Embodiment 1 and Embodiment 2. Further, bands for PUCCH transmission at both ends of the SRS transmission symbol may be spared as a GB or used for PUCCH transmission under circumstances, as is the case with SRS transmission in 3GPP LTE/LTE-A.

Embodiment 4

Embodiment 4 of the present disclosure proposes an HARQ feedback timing designing method according to a radio transmission frame structure dedicated to the Flexible wireless transmission scheme.

To implement a Flexible FDD wireless transmission scheme in which a PUCCH transmission is impossible at a specific time due to the use of the whole or part of a UL band as a DL band, an HARQ timing transmission should be defined based on the same concept as in TDD-LTE. In the legacy TDD-LTE, an ACK/NACK period is fixed due to a predetermined UL/DL configuration. In Flexible FDD according to Embodiment 4, however, since resources may not be allocated for PUCCH transmission at a specific time, it is necessary to set an ACK/NACK transmission time (e.g., a subframe to carry an ACK/NACK) according to a DL/UL ratio at a specific transmission time. While it is described that an ACK/NACK is transmitted using a physical HARQ indicator channel (PHICH) and a PUCCH in Embodiment 4, the ACK/NACK may be transmitted using an enhanced-PHICH (e-PHICH), a physical downlink shared channel (PDSCH), or a physical uplink shared channel (PUSCH).

For wireless transmission in the proposed Flexible FDD frames between a BS and a UE, there is a need for configuring a transmission time of a PUCCH carrying an ACK/NACK for a PDCCH that schedules a PDSCH or a PUSCH. A method for configuring this PUCCH transmission time is summarized as follows.

The UE transmits the PUCCH in a closest UL subframe at least 4 ms after the transmission time of the PDCCH that schedules a PDSCH or a PDSCH.
   PUCCHs are distributed uniformly in each UL subframe in the following manner, so that a bundling window size M may not have a large value in a specific subframe.

If (the number of DL subframes)/(the number of UL subframes) is less than 2, a transmission time of a PUCCH for one PDSCH or a PDCCH scheduling the PDSCH is configured in a UL subframe. Then, a PUCCH for the next PDSCH or a PDCCH scheduling the next PDSCH is transmitted in the next UL subframe. Further, if PUCCH transmission times are configured in all UL subframes, a PUCCH for the next PDSCH or a PDCCH scheduling the next PDSCH is transmitted cyclically in the next UL subframe.

If (the number of DL subframes)/(the number of UL subframes) is equal to or larger than 2, a PUCCH transmission time is configured in one UL subframe so that M may be 2. Then, a PUCCH transmission for the next PDSCH or a PDCCH scheduling the next PDSCH is configured in the next UL subframe so that M may be 2. Further, if PUCCH transmission times are configured in all UL subframes, a PUCCH for the next PDSCH or a PDCCH scheduling the next PDSCH is transmitted cyclically in the next UL subframe.

Hereinbelow, a PUCCH transmission timing configuration for ACK/NACK transmission is proposed based on the above principle of designing a PUCCH transmission time for ACK/NACK transmission.

For the convenience of description, it has been described that an HARQ timing is changed according to the number of contiguous DL transmissions from a UL band for flexible duplex transmission, using 10 subframes as in a TDD system. Further, it has been assumed that there is no DL transmission in four subframes after contiguous UL transmissions in 10 contiguous subframes. If a DL transmission using a UL band within four subframes after contiguous UL transmissions takes place, the above design principle may be modified as the following embodiments may be modified.

Embodiment 4-1

In the case where a GT spanning one subframe is interposed between a DL transmission and a UL transmission (as in Embodiment 2-1), HARQ timings are given as illustrated in [Table 9] (downlink association set index K: $\{k_0, k_1, \ldots, k_{M-1}\}$ in [Table 9]).

TABLE 9

| Number of contiguous DL transmission from UL band of subframe N + 1 | Subframe number N + 1 + i | | | | | | | | | |
|---|---|---|---|---|---|---|---|---|---|---|
| | 0 | 1 | 2 | 3 | 4 | 5 | 6 | 7 | 8 | 9 |
| 1 | | | | 6, 5 | 5, 4 | 4 | 4 | 4 | 4 | 4 |
| 2 | | | | 7, 6 | 6, 5 | 5, 4 | 4 | 4 | 4 | 4 |
| 3 | | | | | 8, 7 | 7, 6 | 6, 5 | 5, 4 | 4 | 4 |
| 4 | | | | | | 9, 8 | 8, 7 | 7, 6 | 6, 5 | 5, 4 |
| 5 | | | | | | | 10, 9 | 9, 8 | 8, 7 | 7, 6, 5, 4 |

Embodiment 4-2

In the case where a GT shorter than one subframe is interposed between a DL transmission and a UL transmission (as in Embodiment 2-2), HARQ timings are given as illustrated in [Table 10] (downlink association set index K: $\{k_0, k_1, \ldots, k_{M-1}\}$ in [Table 10]).

TABLE 10

| Number of contiguous DL transmission from UL band of subframe N + 1 | Subframe number N + 1 + i | | | | | | | | | |
|---|---|---|---|---|---|---|---|---|---|---|
| | 0 | 1 | 2 | 3 | 4 | 5 | 6 | 7 | 8 | 9 |
| 1 | | 5, 4 | 4 | 4 | 4 | 4 | 4 | 4 | 4 | 4 |
| 2 | | | 6, 5 | 5, 4 | 4 | 4 | 4 | 4 | 4 | 4 |
| 3 | | | | 7, 6 | 6, 5 | 5, 4 | 4 | 4 | 4 | 4 |
| 4 | | | | | 8, 7 | 7, 6 | 6, 5 | 5, 4 | 4 | 4 |
| 5 | | | | | | 9, 8 | 8, 7 | 7, 6 | 6, 5 | 5, 4 |

Embodiment 5

In the afore-described Embodiment 1, a PUCCH may be transmitted by allocating resources in a manner that reduces interference in consideration of in-band emission of a DL signal.

In the 3GPP LTE-FDD system, resources for transmission of a control channel (e.g., PUCCH) are separated along the frequency axis in a UL band. That is, resource regions for control channel transmission are located at both ends of the UL band, which is designed to increase the reliability of PUCCH reception through diversity in the frequency domain. In Embodiment 1, however, a part of the legacy PUCCH resources for control channel transmission may be instantaneously used for DL transmission. Due to the resulting disappearance of the part of the legacy regions for PUCCH transmission in Embodiment 1, it is necessary to modify resource mapping for PUCCH transmission.

Moreover, in subband-wise flexible duplex of Embodiment 1, interference occurs to an adjacent UL reception signal in the frequency domain due to in-band emission in an adjacent DL signal, as described before. Therefore, to minimize the influence of in-band emission interference, there is a need for mapping a PUCCH to resources at an end of a UL band so as to decrease interference in consideration of the in-band emission interference.

Embodiment 5-1

In a specific embodiment of Embodiment 5, resources (e.g., RBs) at one end of a UL band, available from among the legacy resources for PUCCH transmission in the UL band may be used for PUCCH transmission.

Figure 17A:
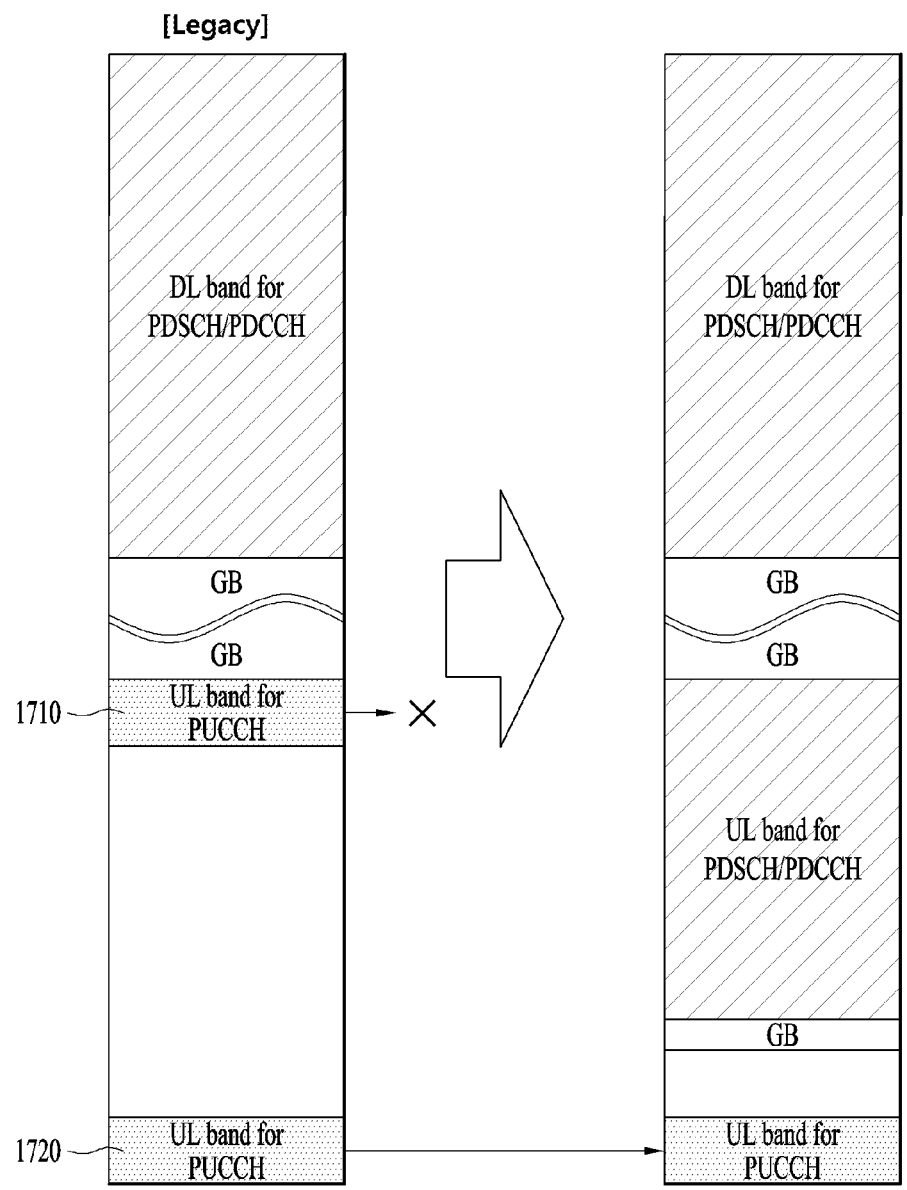
FIGS. 17A to 17C are views illustrating three examples of using only resources for physical uplink control channel (PUCCH) transmission at one side among resources for PUCCH transmission.
Figure 17B:
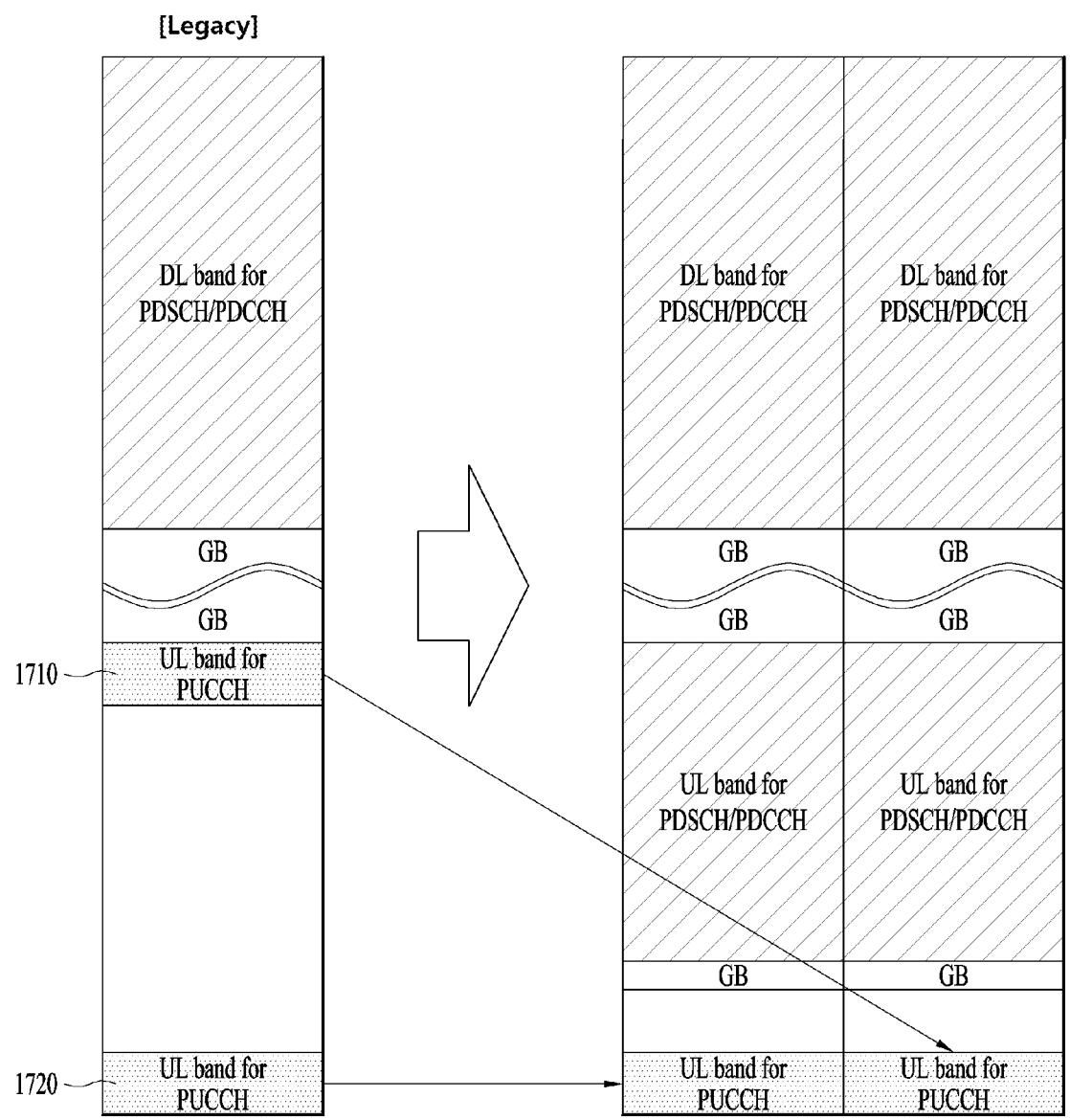
Figure 17C:
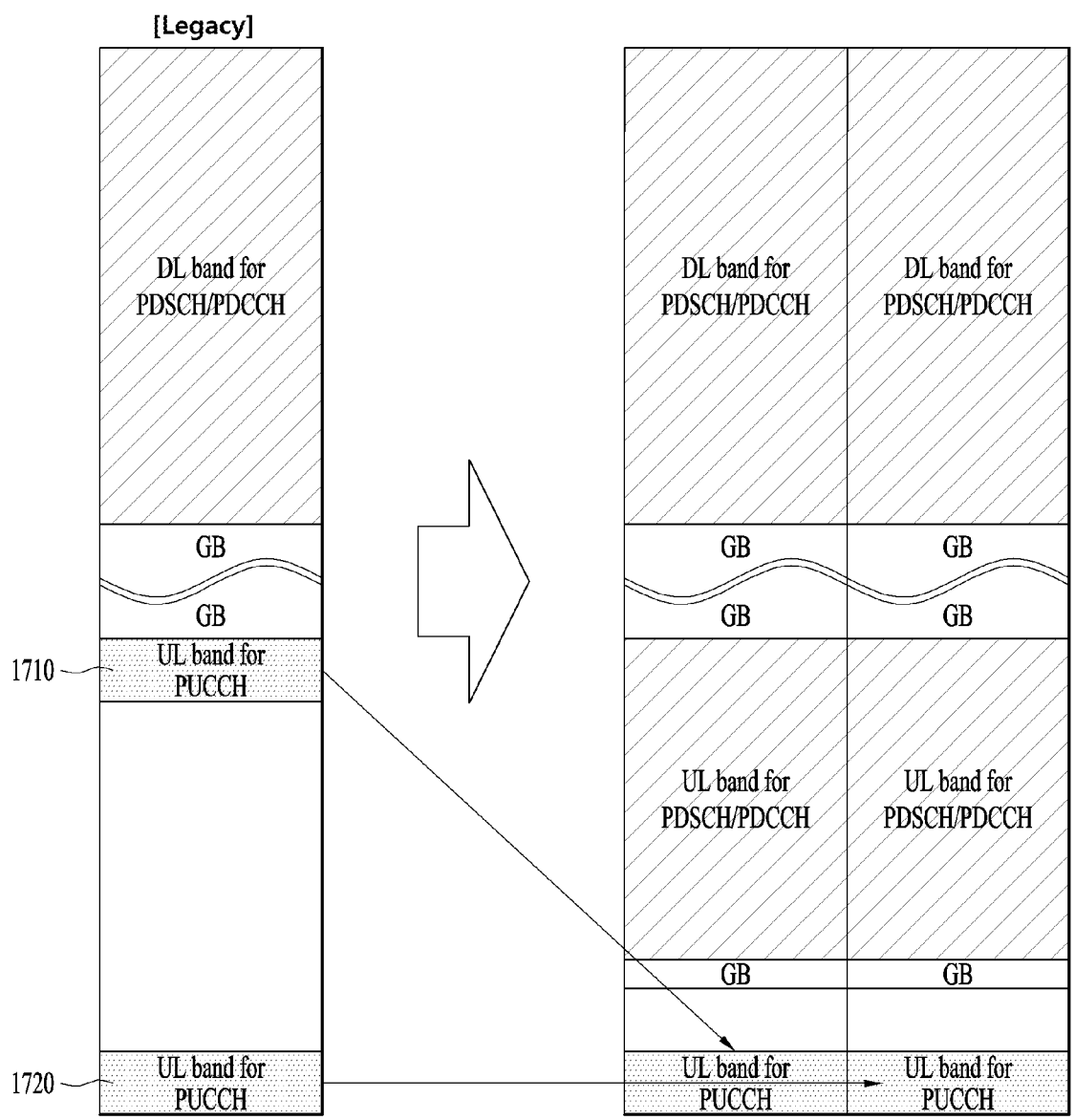

FIGS. 17A to 17C are views illustrating three examples of using only PUCCH transmission resources at one side among PUCCH transmission resources.

As illustrated in FIGS. 17A to 17C, a part of a UL band may be allocated as PDCCH/PDSCH resources in Flexible FDD frame structures. In FIG. 17A, since legacy PUCCH resources 1710 are allocated as PDCCH/PDSCH resources in a corresponding subframe, only resources corresponding to the remaining PUCCH resources 1720 are configured for PUCCH transmission. In the Flexible FDD frame structures, the UE may transmit a PUCCH only in the resources corresponding to the remaining PUCCH resources 1720 which have not been allocated as PDCCH/PDSCH resources in the corresponding subframe.

In FIG. 17A, a PUCCH allocated to the PUCCH resources 1710 and a PUCCH allocated to the PUCCH resources 1720 may deliver the same information (e.g., PUCCH format 1/1a/1b) or different information (e.g., PUCCH format 2, 2a, and 2b).

Referring to FIGS. 17B and 17C, two subframes are shown. The UE may transmit a PUCCH in corresponding resources in the two subframes (preferably, two contiguous subframes). The same PUCCH resources are allocated in FIGS. 17B and 17C but which one of PUCCHs at both ends of a UL band is transmitted in which subframe is different in FIGS. 17B and 17C.

Embodiment 5-2

Resources (e.g., 2 RBs) at one end of a UL band, available from among the legacy resources for PUCCH transmission in the UL band, and adjacent RB(s) may be used for PUCCH transmission. That is, the UE may transmit a PUCCH in the resources (e.g., 2RBs) at one end of the UL band.

Figure 18A:
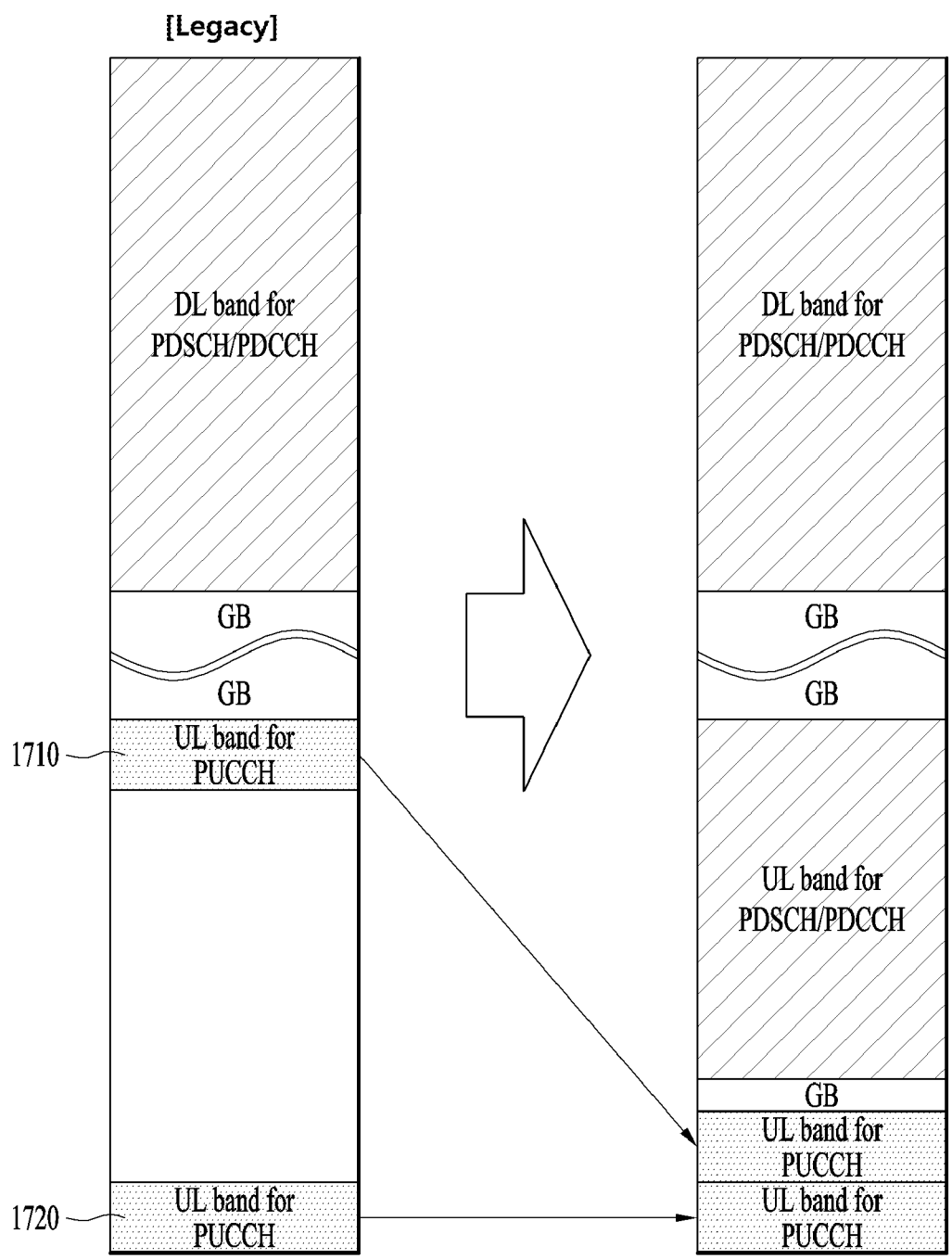
FIGS. 18A and 18B are views illustrating two examples of using resources for PUCCH transmission at one side among resources for PUCCH transmission, and adjacent resources.
Figure 18B:
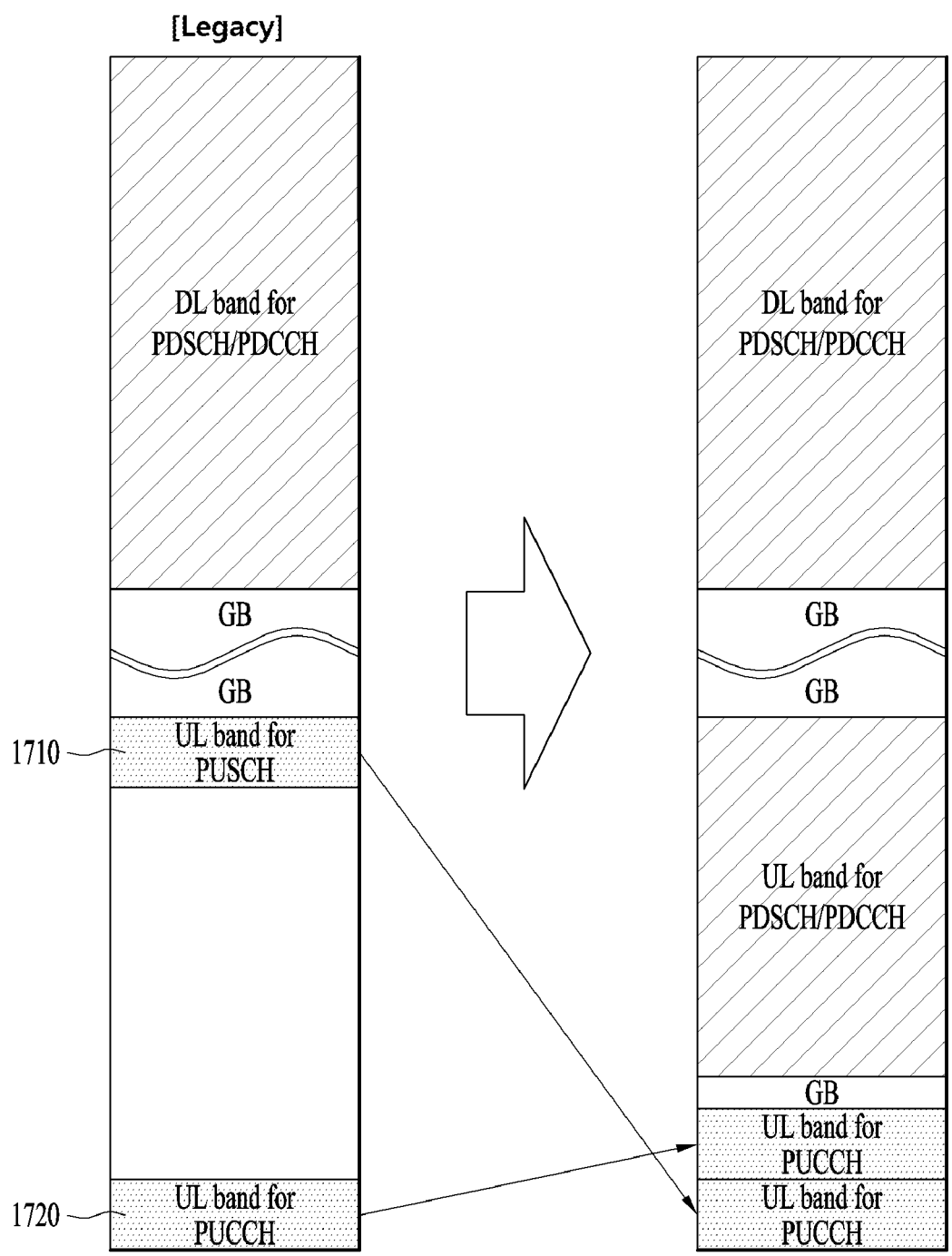

FIGS. 18A and 18B are views illustrating two examples of using resources for PUCCH transmission at one side, and adjacent resources.

FIGS. 18A and 18B illustrate that the legacy PUCCH resources 1710 and 1720 are allocated to resources (e.g., 2RBs) at one end of a UL band, available from among resources for PUCCH transmission in the UL band, and adjacent RB(s) (e.g., 2RBs).

Embodiment 6

For PUCCH transmission with high reliability in the foregoing Embodiment 5, a PUCCH may be transmitted by mapping the PUCCH to resources in a manner that reduces interference in consideration of in-band emission of a DL signal.

To increase the reliability of a PUCCH carrying UL control information (e.g., ACK/NACK, PMI, and CQI) with priority over data even in 3GPP LTE/LTE-A, the PUCCH is mapped to resources in different slots of subframes. However, since a frequency band available for PUCCH transmission may not have a frequency-selective property in Embodiment 5, the legacy LTE/LTE-A frequency PUCCH resource allocation is not viable. Accordingly, the reliability of PUCCH transmission in Embodiment 5 may be increased in the following methods.

Embodiment 6-1

Figure 19:
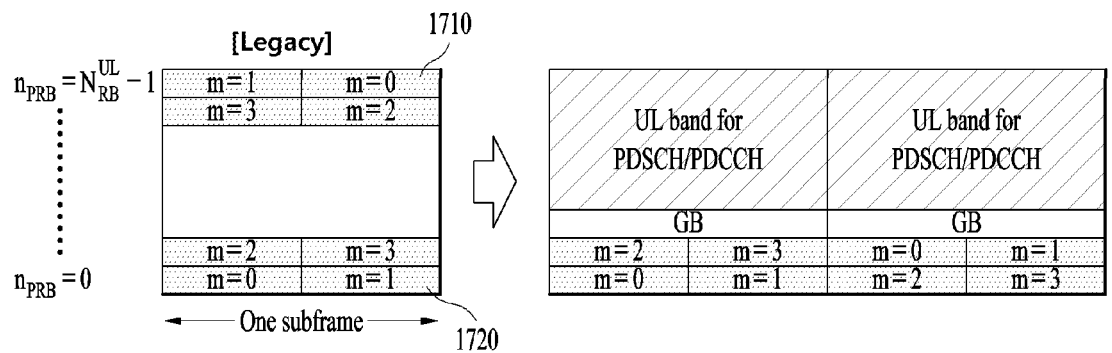
FIG. 19 is a view illustrating exemplary resource mapping for retransmission in consideration of downlink in-band emission and time-domain diversity based on the embodiment illustrated in FIG. 17B.

FIG. 19 is a view illustrating exemplary resource mapping for retransmission in consideration of DL in-band emission and time-domain diversity based on the embodiment illustrated in FIG. 17B.

To increase the reception reliability of a PUCCH in Embodiment 5, when a retransmission is performed in the remaining PUCCH resources, a PUCCH may be mapped by changing an index so that the PUCCH may be transmitted in a PRB and/or slot having a different index, in consideration of DL in-band emission interference. Further, resources may be mapped by changing index m so that PUCCHs may be transmitted as far as possible from each other to achieve time-domain diversity. In the left drawing of FIG. 19, index m is set according to [Equation 1].

$$n_{PRB} = \begin{cases} \left\lfloor \dfrac{m}{2} \right\rfloor & \text{if } (m + n_s \bmod 2)\bmod 2 = 0 \\ N_{RB}^{UL} - 1 - \left\lfloor \dfrac{m}{2} \right\rfloor & \text{if } (m + n_s \bmod 2)\bmod 2 = 1 \end{cases} \quad \text{[Equation 1]}$$

Herein, $n_s$ represents a slot index (or number), and nPRB represents a PRB index (or number). It may be noted from

[Equation 1] that m is determined by a PRB index and a slot index. For example, if an index corresponding to m=0 is allocated to the UE, the UE transmits a PUCCH in a PRB with index 0 in the first slot of a corresponding subframe and in a PRB with a highest index in the second slot of the subframe.

Referring to FIG. 19, the PUCCH resources 1720 of FIG. 17B are allocated to a first subframe, and the PUCCH resources 1710 of FIG. 17B are allocated to a second subframe in the time domain. If the PUCCH resources 1710 are allocated to the second subframe, a PUCCH resource allocation pattern in the second subframe is different from a resource allocation pattern of the PUCCH resources 1710 illustrated in FIG. 19 (i.e., the positions of m values are different). Herein, m is information identified by a slot index and a PRB index to which a PUCCH is allocated. Since a PUCCH is transmitted in two subframes, the PUCCH is allocated to the second subframe in consideration of the PUCCH allocation pattern (the positions of m values) in the first subframe in a manner that maximizes frequency diversity and time diversity for the PUCCH transmission. An index (m=0) allocated to PRB 0 in the first slot of the first subframe is allocated to PRB 1 in the first slot of the second subframe. In this manner, an index (e.g., m=1) allocated to the first subframe is allocated in a PRB with a different index in the same slot of the second subframe.

For example, if index 0 (m=0) is allocated to the UE, the UE may transmit a PUCCH in PRB 0 of the first slot in the first subframe and in PRB 1 of the first slot in the second subframe.

Embodiment 6-2

Figure 20:
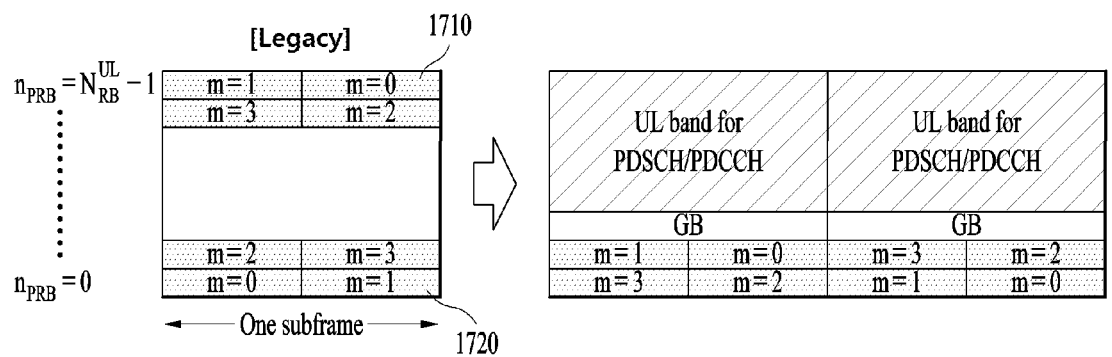
FIG. 20 is a view illustrating exemplary resource mapping for retransmission in consideration of downlink in-band emission and time-domain diversity based on the embodiment illustrated in FIG. 17C.

FIG. 20 is a view illustrating exemplary resource mapping for retransmission in consideration of DL in-band emission and time-domain diversity based on the embodiment illustrated in FIG. 17C.

Referring to FIG. 20, the PUCCH resources 1710 are allocated to a band at the end of a UL band in a first subframe. The PUCCH resources 1720 are allocated to a second subframe in a different allocation pattern by changing the positions of m values to maximize frequency diversity and time diversity for the PUCCH transmission.

Embodiment 6-3

Figure 21:
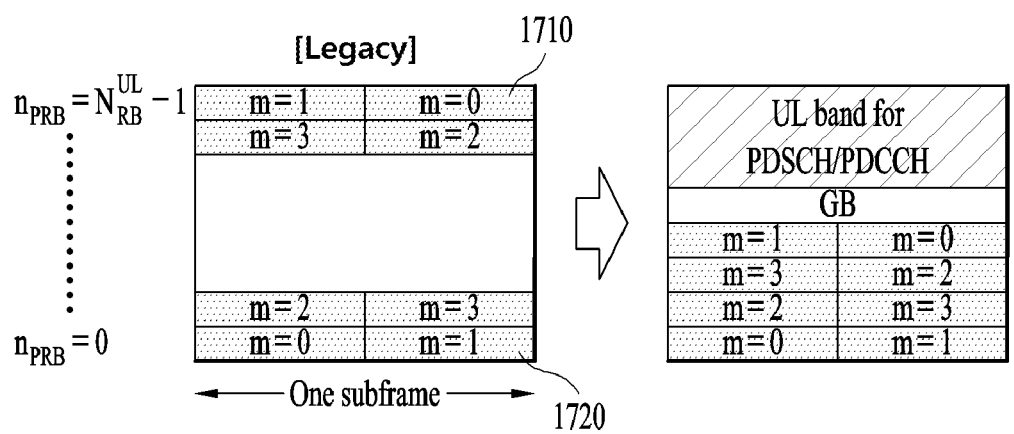
FIG. 21 is a view illustrating exemplary resource mapping for retransmission in consideration of downlink in-band emission and time-domain diversity based on the embodiment illustrated in FIG. 18A.

FIG. 21 is a view illustrating exemplary resource mapping for retransmission in consideration of DL in-band emission and time-domain diversity based on the embodiment illustrated in FIG. 18A.

Referring to FIG. 21, the PUCCH resources 1720 are allocated to a band at the end of a UL band in a corresponding subframe. The PUCCH resources 1710 are allocated to a band adjacent to the band at the end of the UL band, to which the PUCCH has been allocated.

Embodiment 6-4

Figure 22:
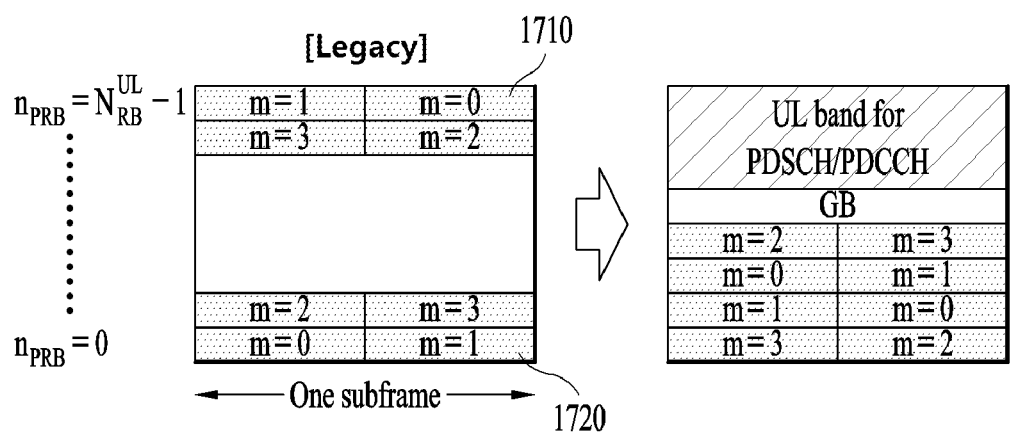
FIG. 22 is a view illustrating exemplary resource mapping for retransmission in consideration of downlink in-band emission and time-domain diversity based on the embodiment illustrated in FIG. 18B.

FIG. 22 is a view illustrating exemplary resource mapping for retransmission in consideration of DL in-band emission and time-domain diversity based on the embodiment illustrated in FIG. 18B.

Referring to FIG. 22, the PUCCH resources 1710 are allocated to a band at the end of a UL band in a corresponding subframe. The PUCCH resources 1720 are allocated to a band adjacent to the band at the end of the UL band, to which the PUCCH has been allocated.

To increase the reliability of a PUCCH, a PUSCH may be piggybacked with the PUCCH by eliminating a part of the PUSCH in Embodiment 6.

Embodiment 6-5

A PUCCH may be transmitted in the following manner based on the first embodiment of Embodiment 5-2.

Figure 23:
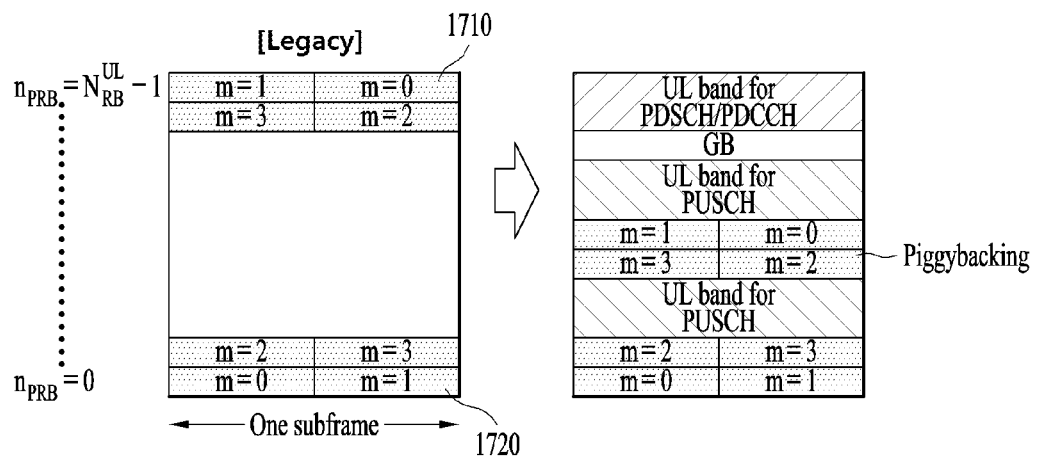
FIG. 23 is a view illustrating exemplary PUCCH resource mapping based on the embodiment illustrated in FIG. 18A.

FIG. 23 is a view illustrating exemplary PUCCH resource mapping based on the embodiment illustrated in FIG. 18A.

Referring to FIG. 23, the PUCCH resources 1720 are allocated to a band at the end of a UL band in a corresponding subframe. PUCCHs corresponding to the PUCCH resources 1710 may be transmitted piggybacked to PUSCH resources.

Embodiment 6-6

Figure 24:
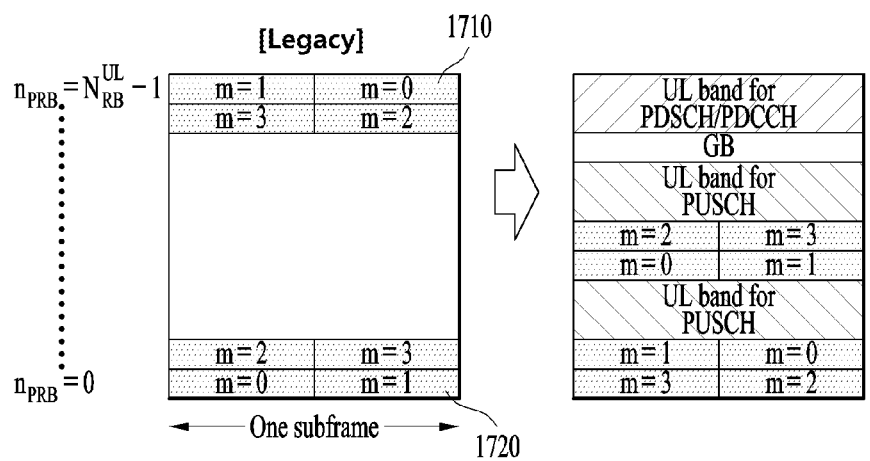
FIG. 24 is a view illustrating exemplary PUCCH resource mapping based on the embodiment illustrated in FIG. 18B.

FIG. 24 is a view illustrating exemplary PUCCH resource mapping based on the embodiment illustrated in FIG. 18B.

Referring to FIG. 24, the PUCCH resources 1710 are allocated to a band at the end of a UL band in a corresponding subframe. PUCCHs corresponding to the PUCCH resources 1720 may be transmitted piggybacked to PUSCH resources.

Embodiment 7

To more efficiently use a UL band configured for UL transmission, reduced in Embodiment 1, transmission of a PUSCH is allowed in a legacy frequency region configured for PUCCH transmission.

In the 3GPP LTE-FDD system, resources for data channel transmission and resources for control channel transmission are separately configured in a UL band. That is, resources (e.g., 2 RBs) at both ends of the UL band are separately configured as regions for control channel transmission, and transmission of a PUSCH is not allowed in these regions. However, in Embodiment 1, a part of the legacy PUCCH resources for control channel transmission are used instantaneously for DL transmission, and a part of a PUSCH region is also used instantaneously for DL transmission. Accordingly, to more efficiently use a UL band configured for UL transmission, reduced in Embodiment 1, transmission of a PUSCH may be allowed in a frequency region configured for PUCCH transmission.

Embodiment 7-1

Figure 25:
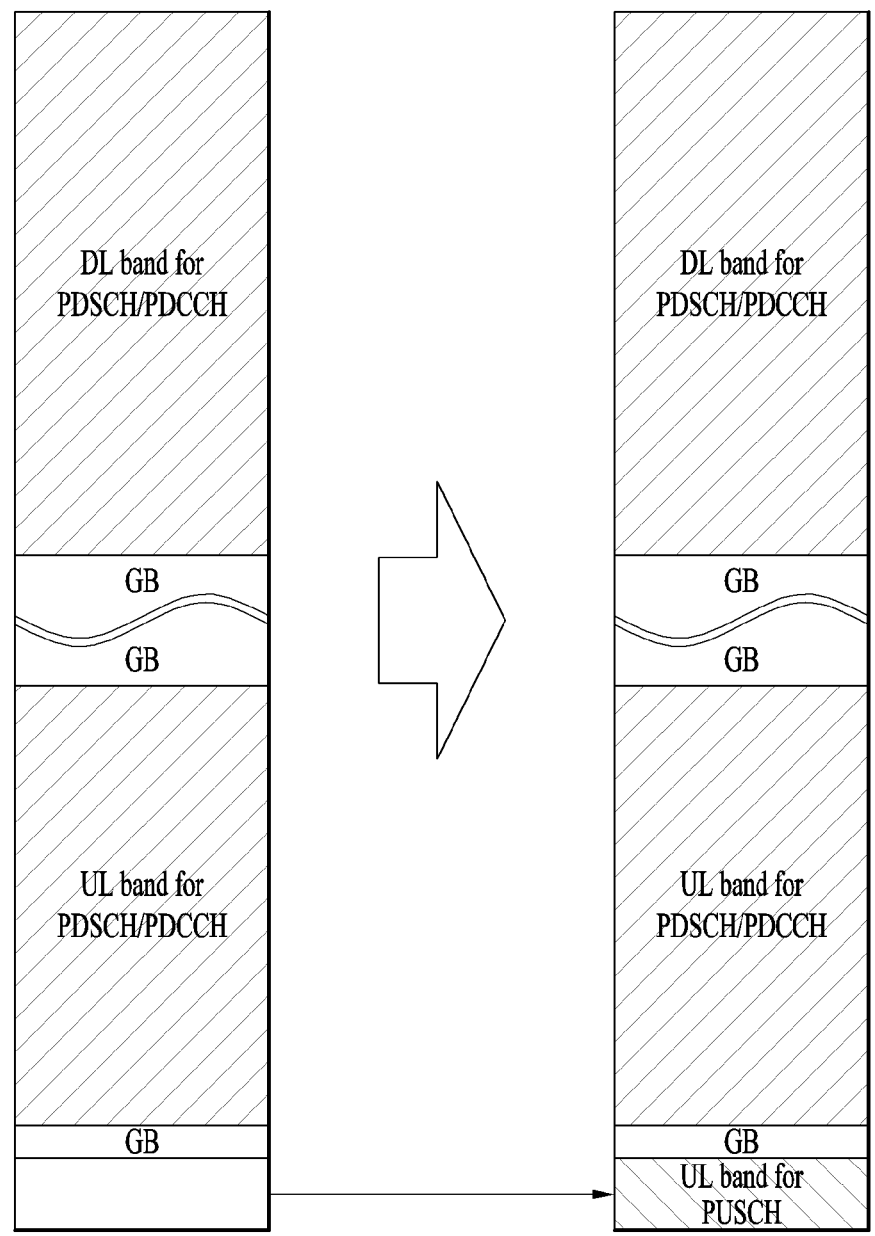
FIG. 25 is a view illustrating exemplary physical uplink shared channel (PUSCH) transmission only in a PUCCH region.

FIG. 25 is a view illustrating exemplary PUSCH transmission only in a PUCCH region.

Referring to FIG. 25, the UE may transmit a PUSCH only in a PUCCH region at the end of a UL band, in which a PUCCH is not transmitted.

Embodiment 7-2

Figure 26:
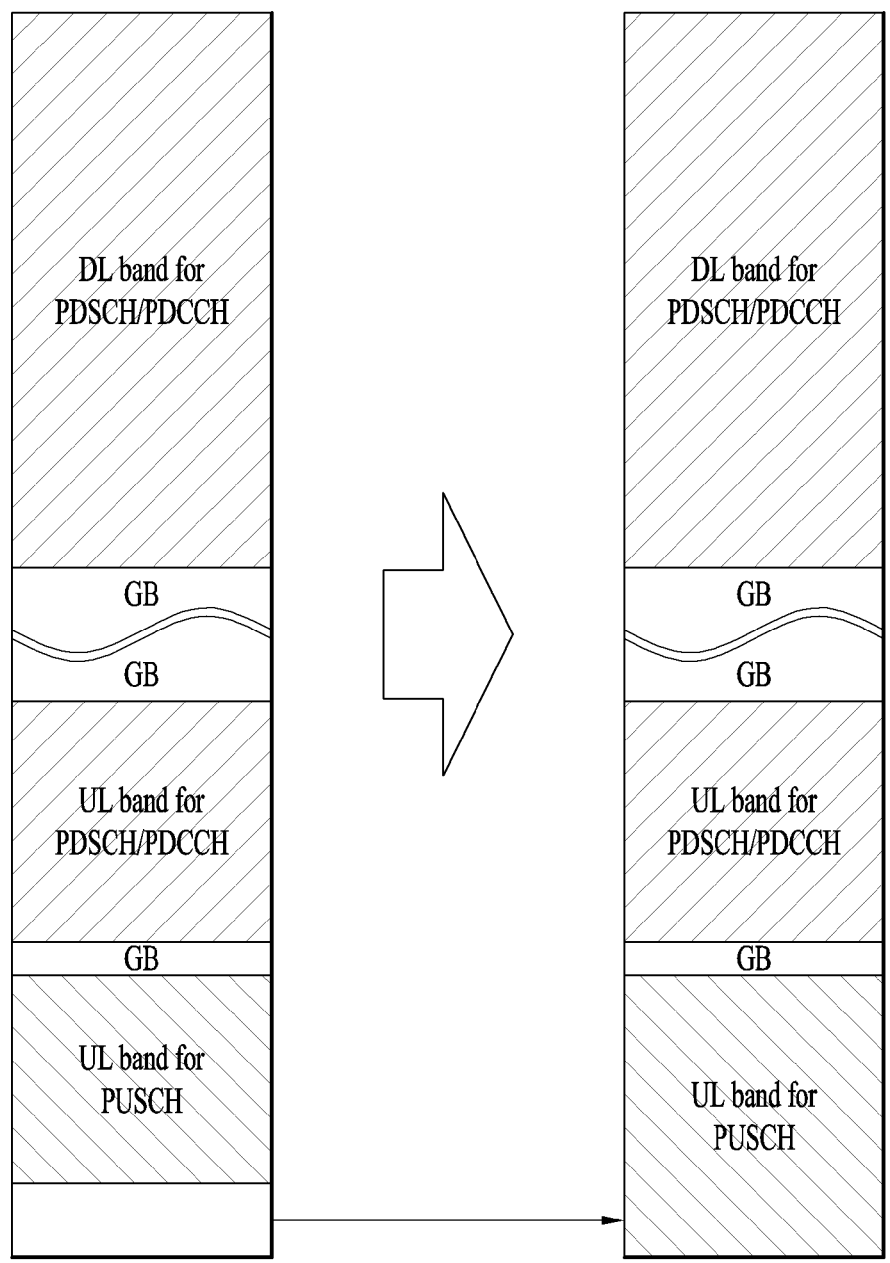
FIG. 26 is a view illustrating exemplary PUSCH transmission in an aggregate of a PUCCH region and a PUSCH region.

FIG. 26 is a view illustrating exemplary PUSCH transmission in an aggregate of a PUCCH region and a PUSCH region.

Referring to FIG. 26, the UE may transmit a PUSCH in resources in which a legacy PUSCH region and a region allocated for PUCCH transmission are aggregated.

Embodiment 8

It is proposed that a PUSCH and a PUCCH are transmitted simultaneously in a corresponding subframe based on the foregoing Embodiment 1 to Embodiment 6.

In the legacy LTE/LTE-A system, simultaneous transmission of a PUSCH and a PUCCH is limited due to the issue of the limited maximum power of a UE. However, the power issue has been solved naturally due to the increased power efficiency of a UE and an instantaneous decrease of a UL bandwidth. Furthermore, since a PUCCH region has already been allocated, frequency use efficiency is inevitably decreased. To solve this problem, a PUCCH and a PUSCH may be transmitted simultaneously.

Embodiment 8-1

Figure 27:
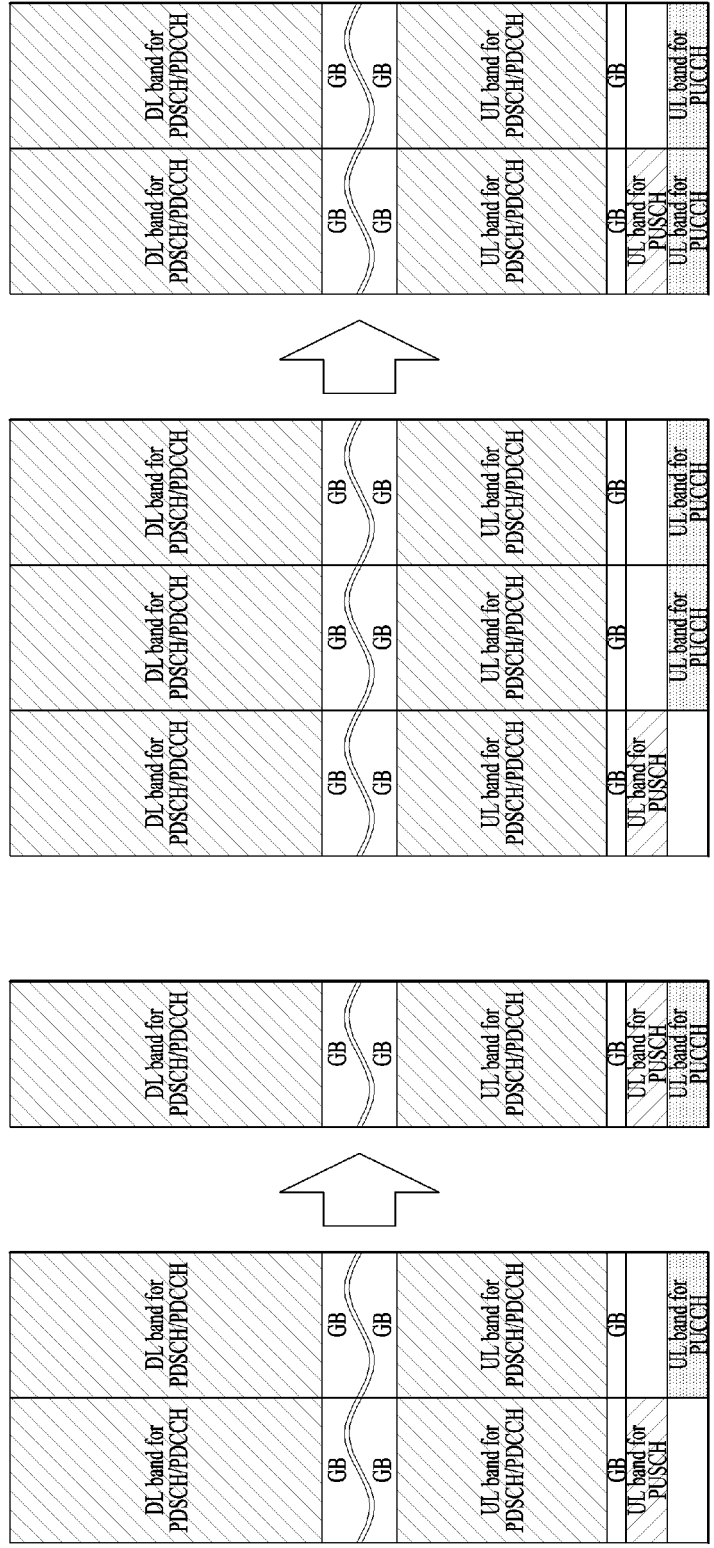
FIG. 27 is a view illustrating exemplary simultaneous transmission of a PUCCH and a PUSCH.

FIG. 27 is a view illustrating exemplary simultaneous transmission of a PUCCH and a PUSCH.

In Embodiment 1 and Embodiment 5-1, while two or three symbols are required for transmission of a PUSCH and a PUCCH, one or two symbols are required for simultaneous transmission of a PUSCH and a PUCCH.

Embodiment 8-2

Figure 28:
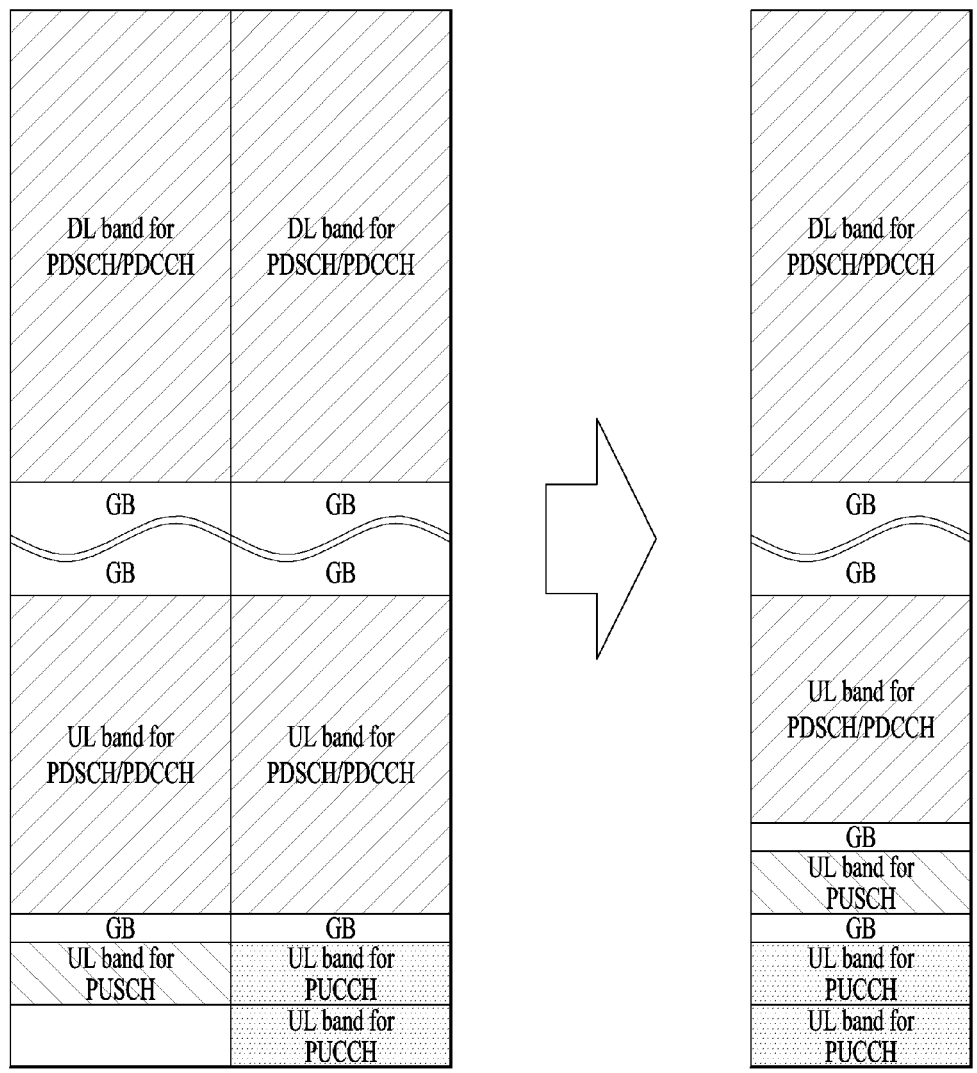
FIG. 28 is a view illustrating exemplary simultaneous transmission of a PUCCH and a PUSCH.

FIG. 28 is a view illustrating exemplary simultaneous transmission of a PUCCH and a PUSCH.

In Embodiment 1 and Embodiment 5-2, transmission of a PUSCH and a PUCCH is possible in one symbol.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. In addition, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

Those skilled in the art will appreciate that the present invention may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The method for transmitting a PUCCH in an FDD frame by a UE in a wireless communication system is industrially applicable to various wireless communication systems including a 3GPP LTE/LTE-A system, a 5G communication system, and so on.

The invention claimed is:

1. A method for transmitting a physical uplink control channel (PUCCH) using a frequency division duplex (FDD) frame by a user equipment (UE) in a wireless communication system, the method comprising:

transmitting the PUCCH on $n^{th}$ slots of each of two subframes in an uplink band of the FDD frame, wherein $m^{th}$ slots in each of the two subframes includes a resource for downlink reception in the uplink band of the FDD frame, where 'n' is an integer different from 'm', wherein the PUCCH is transmitted in a physical resource block (PRB) with index k in the $n^{th}$ slot of a first subframe of the two subframes and a PRB with index k+1 in the $n^{th}$ slot of a second subframe of the two subframes, or the PUCCH is transmitted in a PRB with index k+1 in the $n^{th}$ slot of the first subframe of the two subframes and a PRB with index k in the $n^{th}$ slot of the second subframe of the two subframes, and wherein the index k is equal to '0'.

2. The method according to claim 1, wherein the PUCCH is transmitted in a PRB with index 0 in a first slot of the first subframe of the two subframes, and a PRB with index 1 in a first slot of the second subframe of the two subframes.

3. The method according to claim 1, wherein the PUCCH is transmitted in a PRB with index 1 in a first slot of the first subframe of the two subframes, and a PRB with index 0 in a first slot of the second subframe of the two subframes.

4. The method according to claim 1, wherein the PUCCH is transmitted in a PRB with index 0 in a second slot of the first subframe of the two subframes, and a PRB with index 1 in a second slot of the second subframe of the two subframes.

5. The method according to claim 1, wherein the PUCCH is transmitted in a PRB with index 1 in a second slot of the first subframe of the two subframes, and a PRB with index 0 in a second slot of the second subframe of the two subframes.

6. The method according to claim 1, wherein the two subframes are contiguous.

7. A user equipment (UE) for transmitting a physical uplink control channel (PUCCH) using a frequency division duplex (FDD) frame in a wireless communication system, the UE comprising:

a transmitter; and a processor, wherein the processor controls transmission of the PUCCH on $n^{th}$ slots of each of two subframes in an uplink band of the FDD frame, and wherein $m^{th}$ slots in each of the two subframes includes a resource for downlink reception in the uplink band of the FDD frame, where 'n' is an integer different from 'm', wherein the processor controls transmission of the PUCCH in a physical resource block (PRB) with index k in the $n^{th}$ slot of a first subframe of the two subframes and a PRB with index k+1 in the $n^{th}$ slot of a second subframe of the two subframes, or controls transmission of the PUCCH in a PRB with index k+1 in the $n^{th}$ slot of a first subframe of the two subframes and a PRB with index k in the $n^{th}$ slot of a second subframe of the two subframes, and wherein the k is equal to '0'.

8. The UE according to claim 7, wherein the processor controls transmission of the PUCCH in a PRB with index 0 in a first slot of the first subframe of the two subframes, and a PRB with index 1 in a first slot of the second subframe of the two subframes.

9. The UE according to claim 7, wherein the processor controls transmission of the PUCCH in a PRB with index 1 in a first slot of the first subframe of the two subframes, and a PRB with index 0 in a first slot of the second subframe of the two subframes.

10. The UE according to claim 7, wherein the processor controls transmission of the PUCCH in a PRB with index 0 in a second slot of the first subframe of the two subframes, and a PRB with index 1 in a second slot of the second subframe of the two subframes.

11. The UE according to claim 7, wherein the processor controls transmission of the PUCCH in a PRB with index 1 in a second slot of the first subframe of the two subframes, and a PRB with index 0 in a second slot of the second subframe of the two subframes.

12. The UE according to claim 7, wherein the two subframes are contiguous.

* * * * *